May 28, 1968            S. M. BUU            3,385,960
ELECTRONIC RATIO CALCULATOR PERFORMING ALIGNING
AND SUBTRACTION OPERATIONS
Filed April 13, 1964            9 Sheets-Sheet 2

INVENTOR
STEVE M. BUU
BY
Wolfe, Hubbard, Voit & Osann
ATTORNEYS.

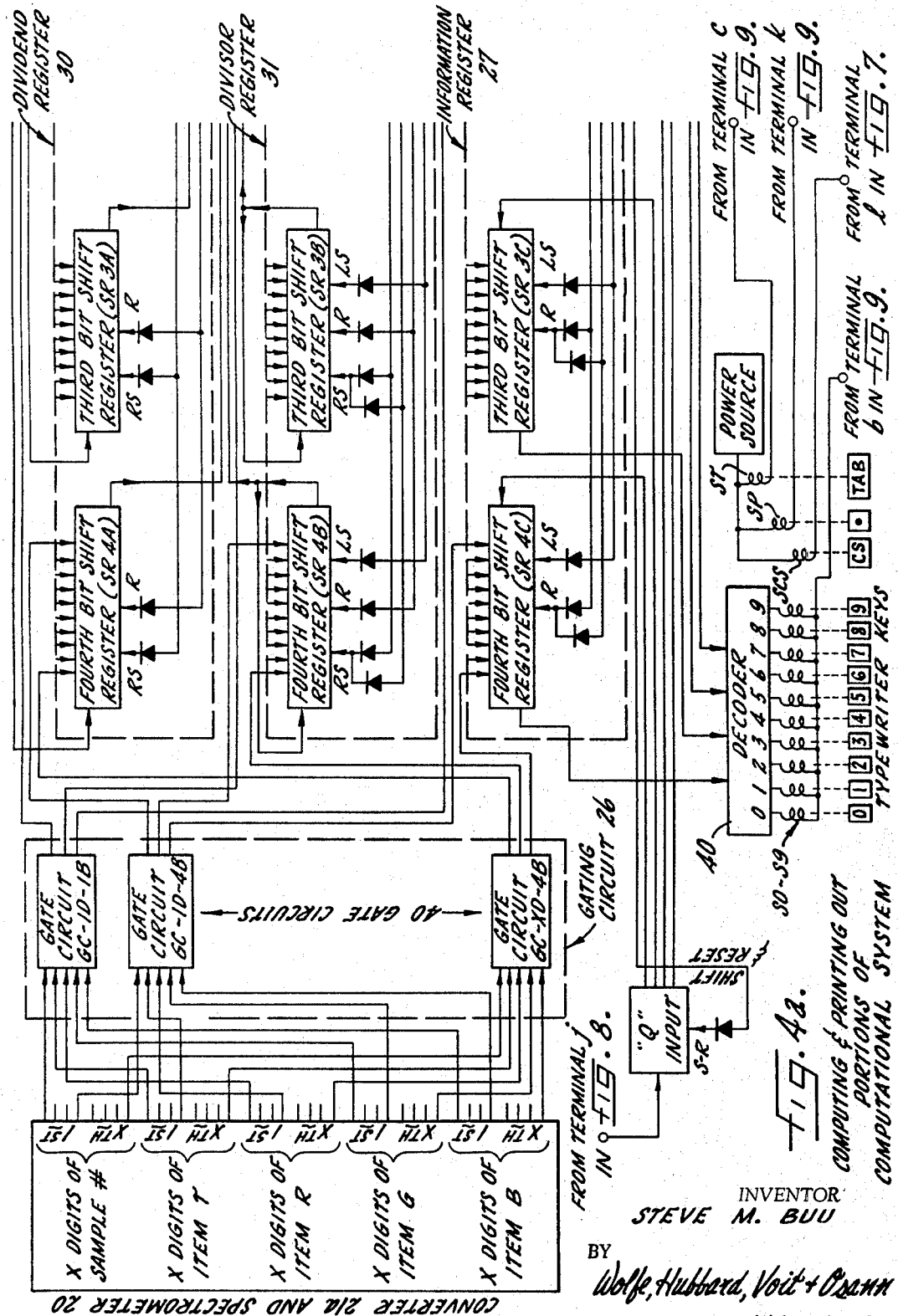

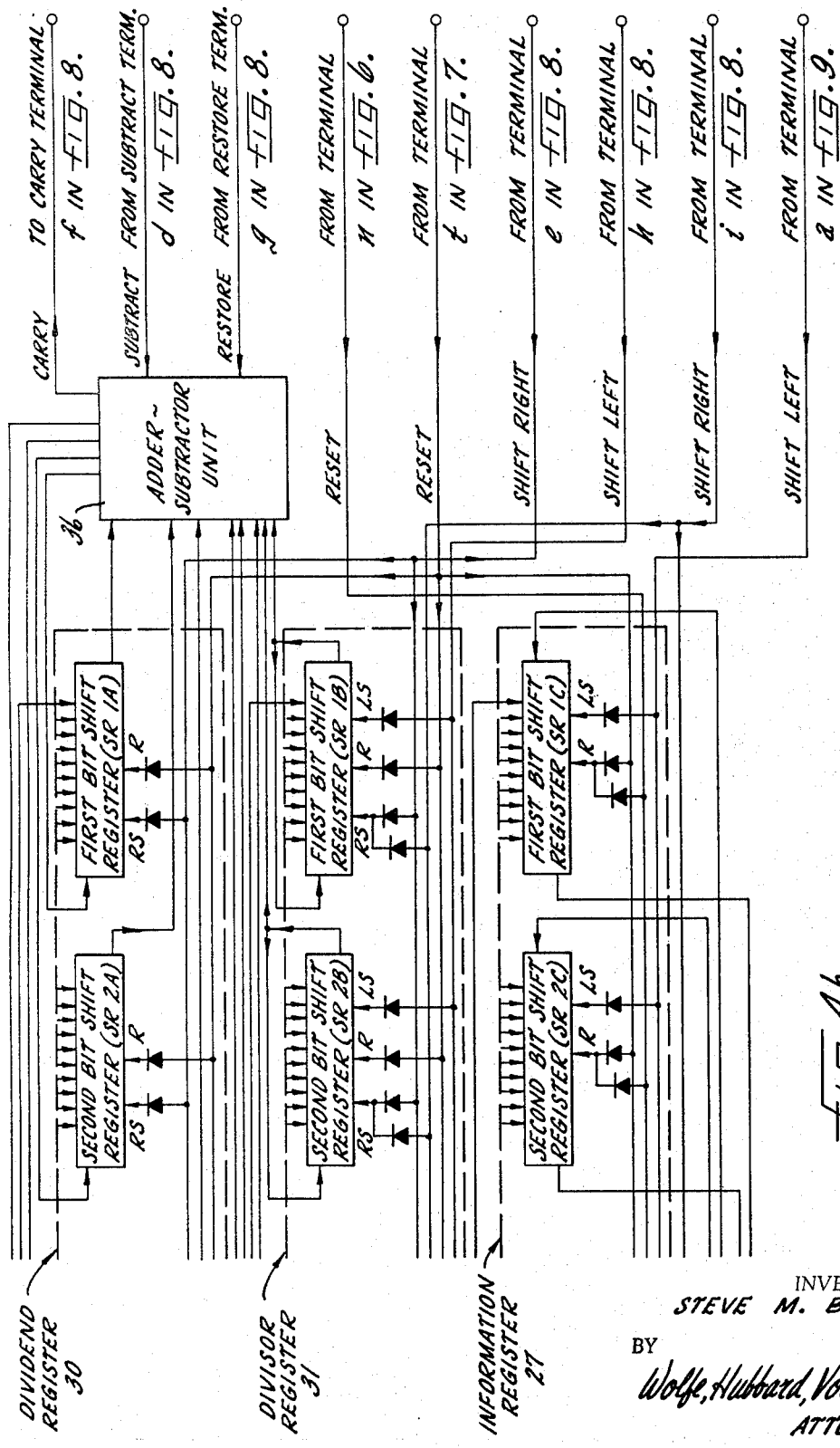

May 28, 1968  S. M. BUU  3,385,960
ELECTRONIC RATIO CALCULATOR PERFORMING ALIGNING
AND SUBTRACTION OPERATIONS
Filed April 13, 1964  9 Sheets-Sheet 5
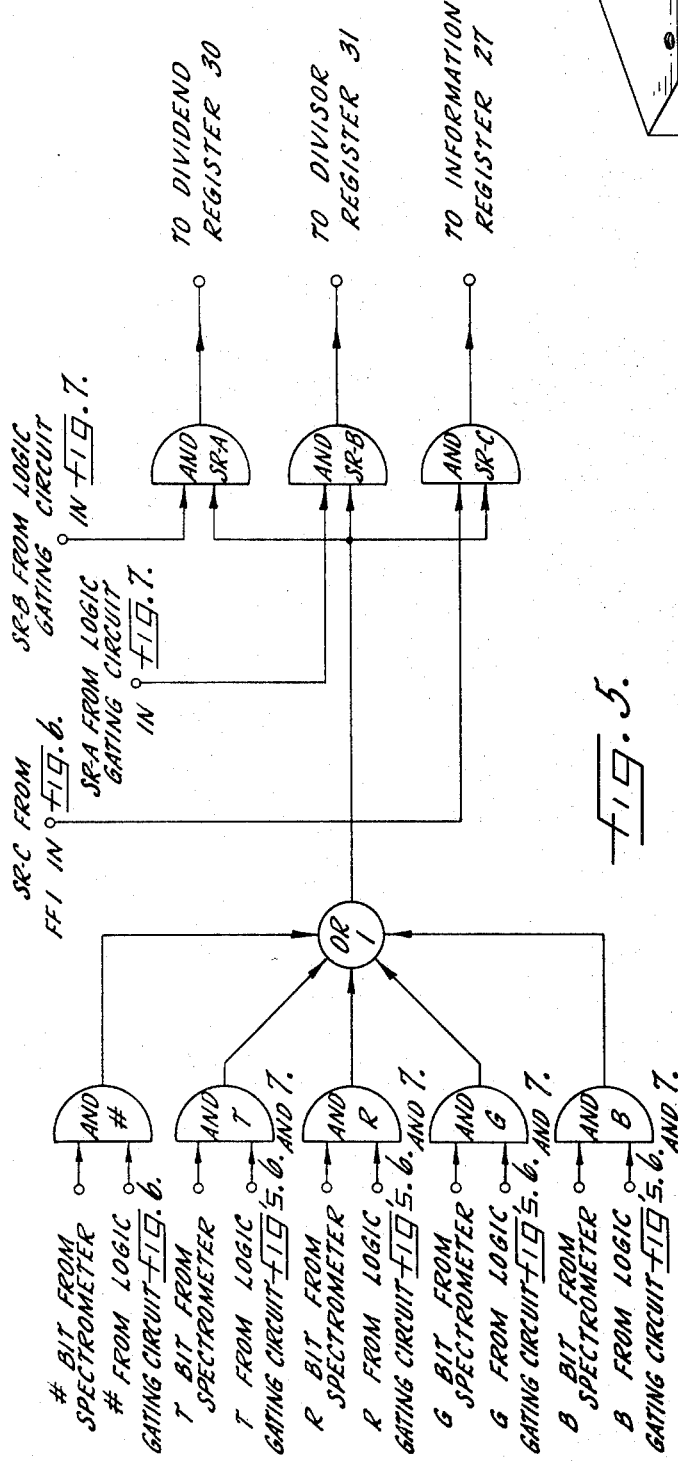
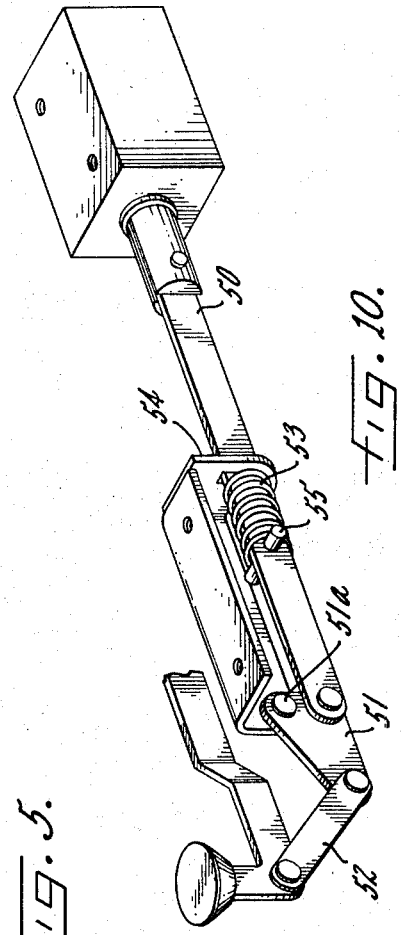
INVENTOR
STEVE M. BUU
BY
*Wolfe, Hubbard, Voit & Osann*
ATTORNEYS.

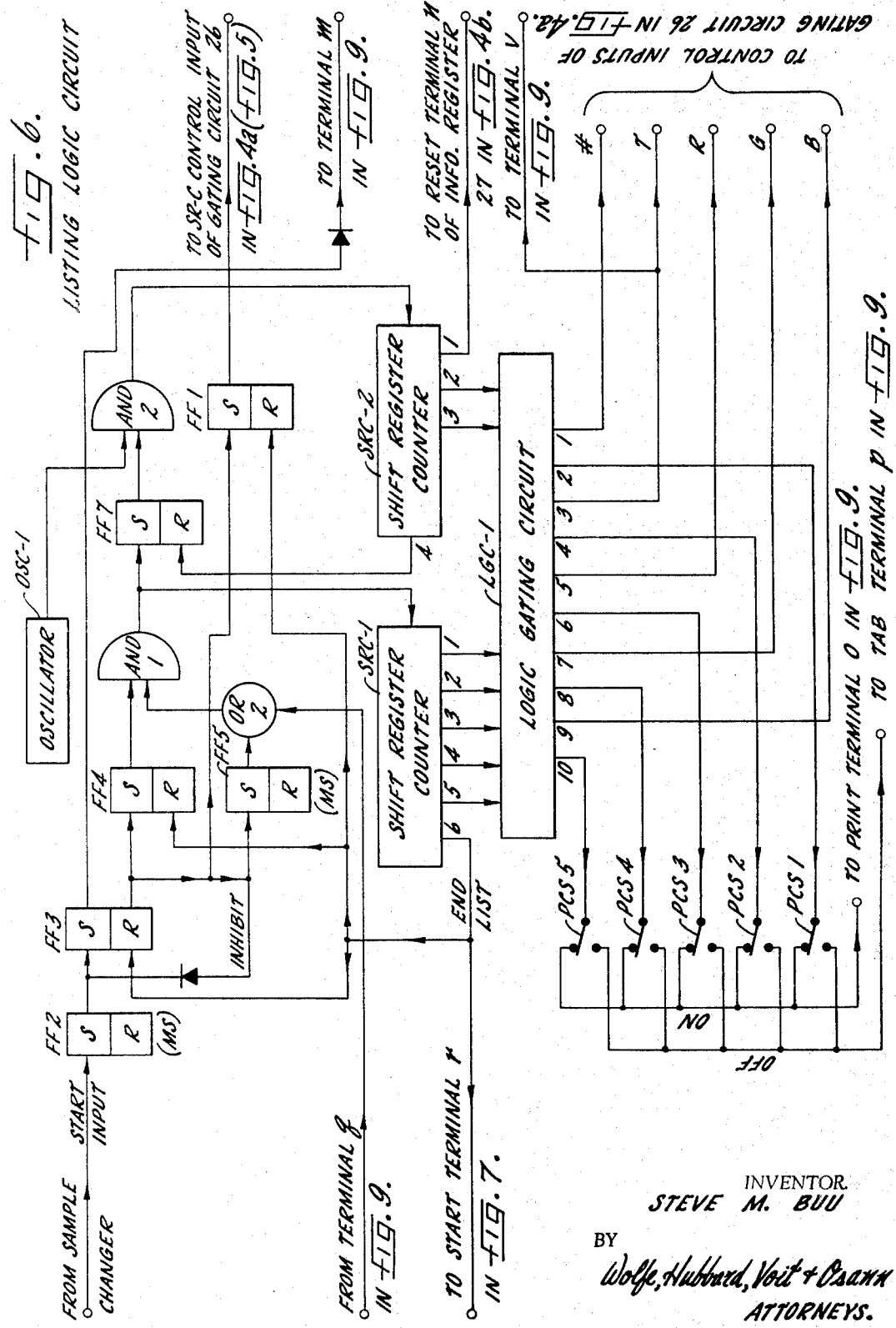

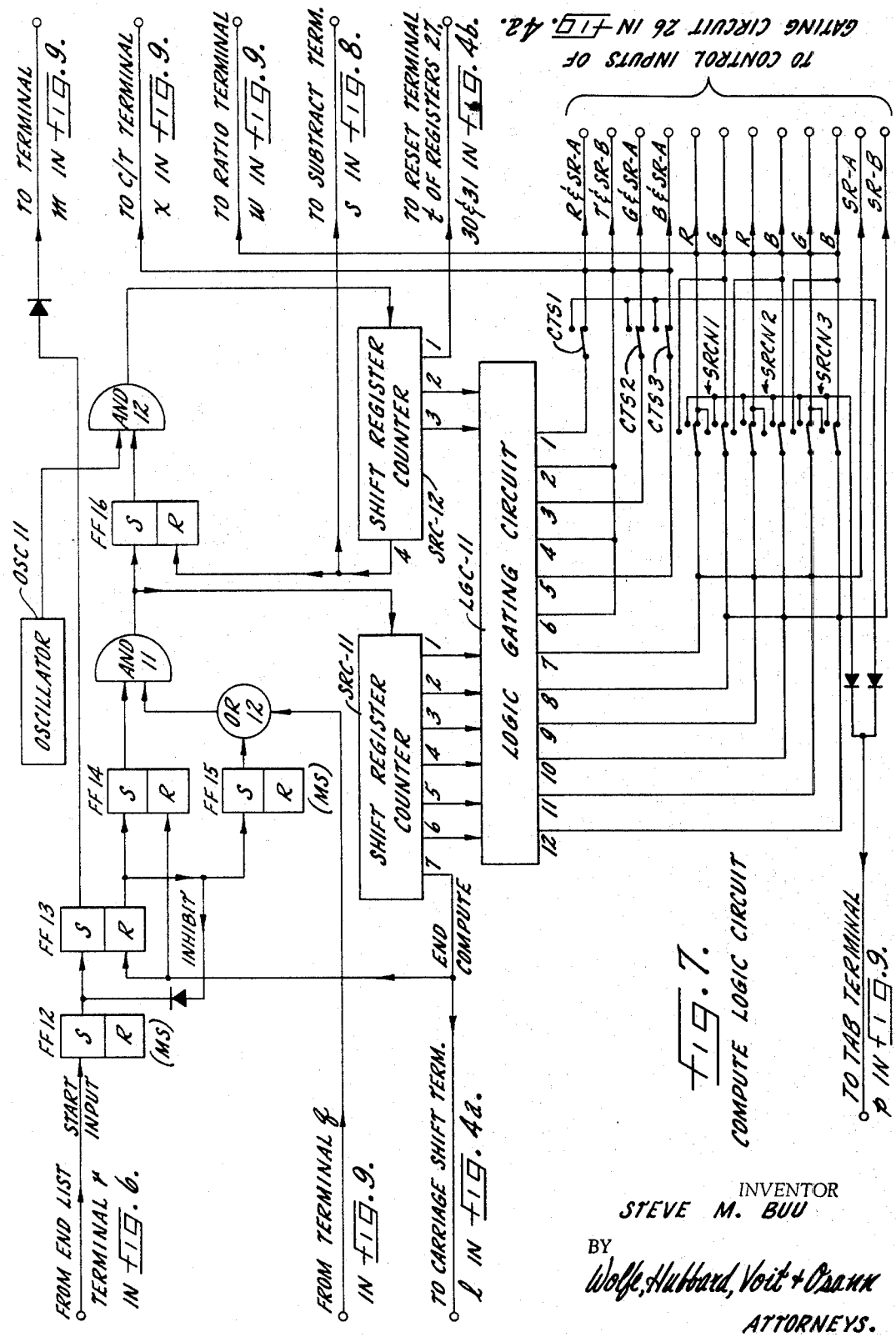

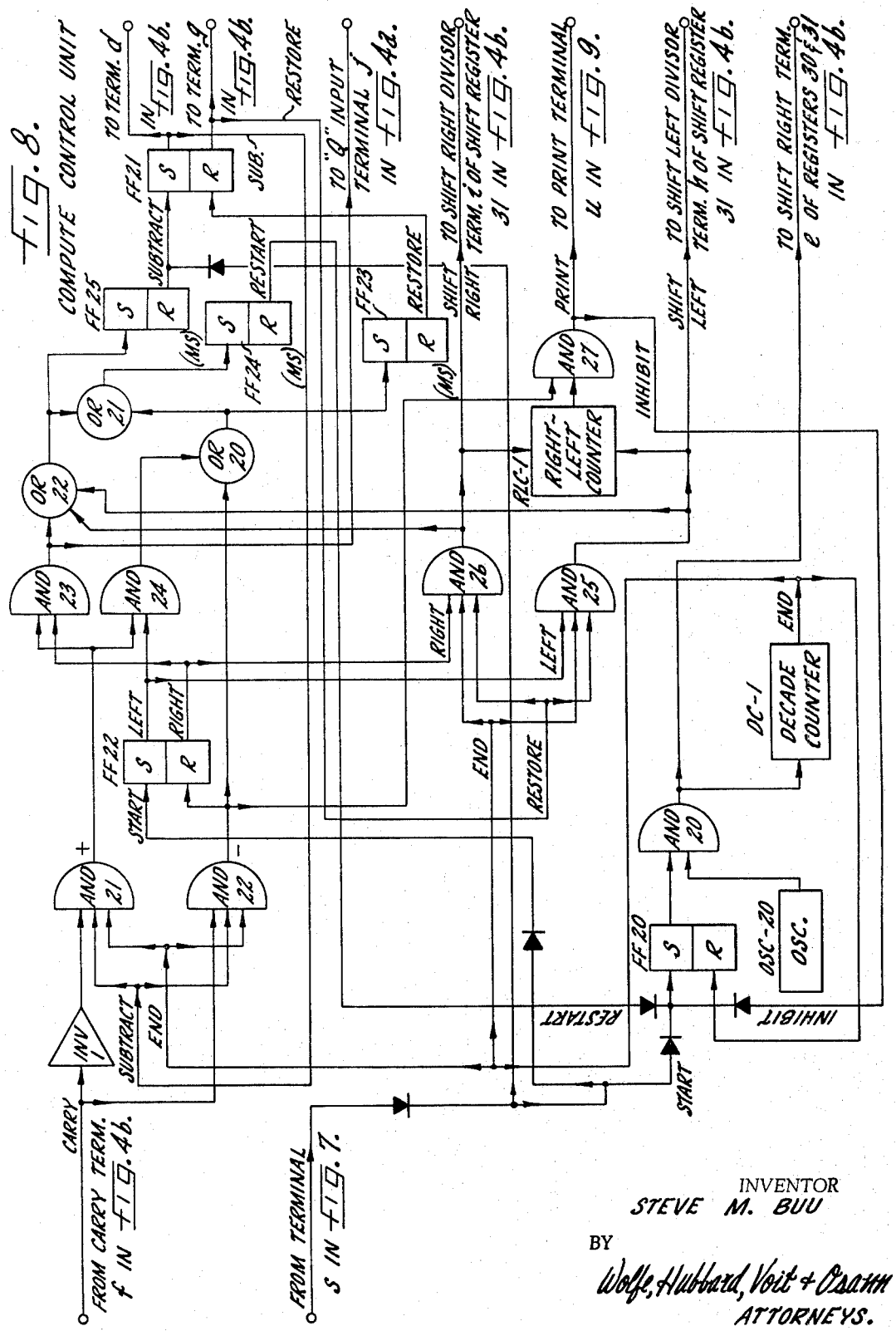

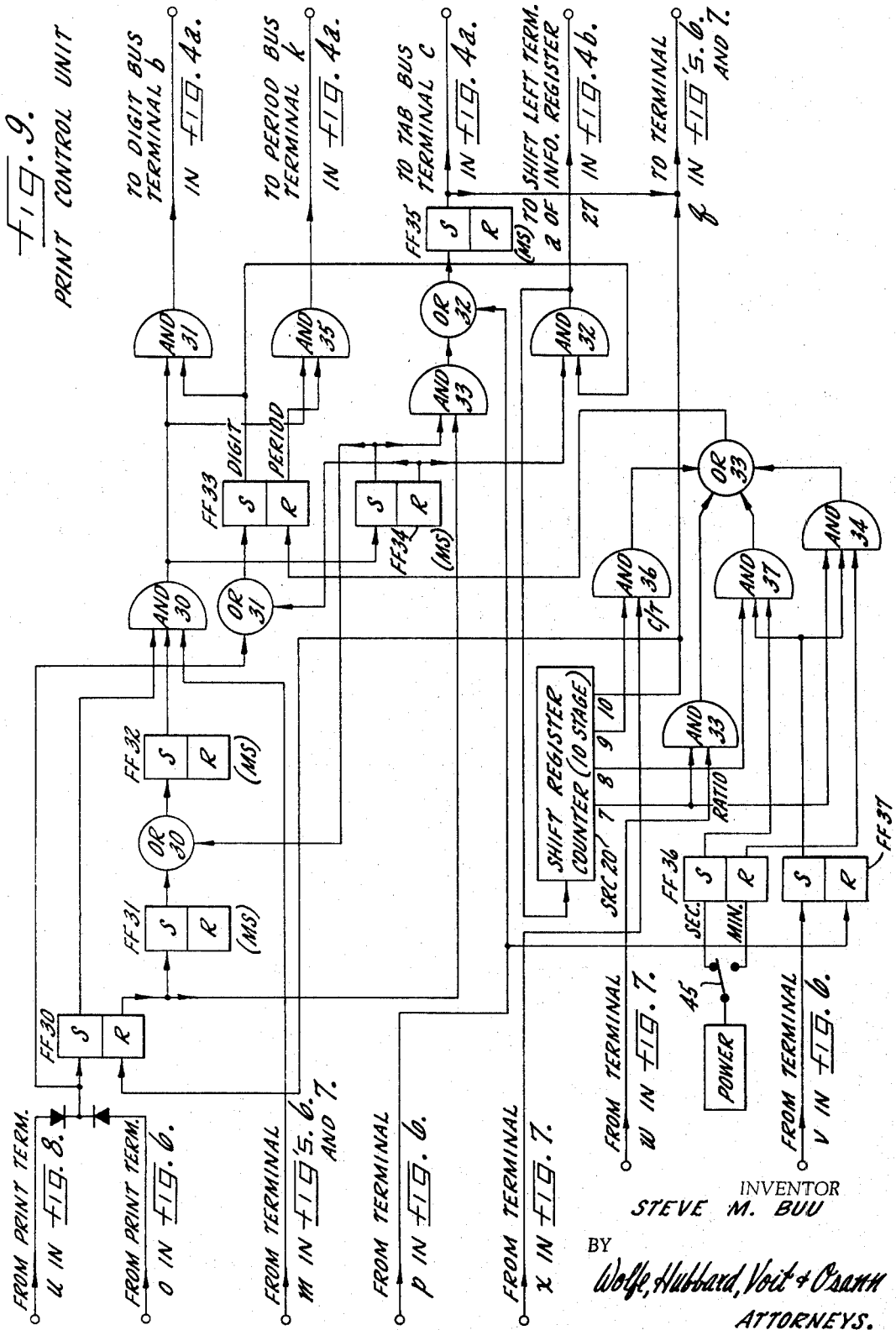

United States Patent Office 3,385,960
Patented May 28, 1968

3,385,960
ELECTRONIC RATIO CALCULATOR PERFORMING ALIGNING AND SUBTRACTION OPERATIONS
Steve M. Buu, Brookfield, Ill., assignor, by mesne assignments, to Packard Instrument Company, Inc., Downers Grove, Ill., a corporation of Delaware
Filed Apr. 13, 1964, Ser. No. 359,037
13 Claims. (Cl. 235—159)

The present invention relates in general to a data processing system and, more particularly, to apparatus for rapidly producing the ratio of two numbers.

When processing observed or measured information representative, for example, of the activity levels or similar characteristics of particular radioactive test samples, it is not only desirable to generate data representative of the detected or measured characteristics, but it is often also desirable to produce data representative of one or more ratios of some or all of the detected or measured characteristics. Accordingly, an effective data processing system capable of meeting these requirements must include means for performing the desired division operations. In the past, it has been a common expedient to employ a mechanical or electromechanical calculator such, for example, as those manufactured by the Monroe Calculator Machine Company, Inc., for performing the desired division operations. However, such a system, being electromechanical in operation, has proved to be relatively slow and requires considerable maintenance by personnel having special qualifications enabling them to understand the operation of such units.

It is a general aim of the present invention to provide an improved data processing system which overcomes the foregoing disadvantages and which is characterized by its rapidity and reliability in operation. In this connection, it is an object of the invention to provide improved apparatus for processing observed or measured information bits.

Another object of the invention is to provide new and improved methods and apparatus for processing information bits based upon different observed and calculated quantities representative of diverse characteristics of radioactive test samples such, by way of example, as the energy or activity level of each sample as measured by conventional spectrometer apparatus in terms of count time, counts recorded in one or more scalers, counts per unit time for each different scaler and ratios of counts recorded in the different scalers.

In another of its important aspects, it is an object of the invention to provide new calculating methods and apparatus characterized by their ability to rapidly, reliably and quietly divide observed, detected or known quantities by other observed, detected or known quantities so as to attain useful ratio information.

A more specific object of the invention is to provide an all-electronic calculator system capable of performing desired ratio calculations by (1) initially aligning the divisor with the dividend by digitally shifting it to the left to the last position at which the value of the dividend is greater than the value of the divisor, (1) subtracting the divisor digits from the corresponding dividend digits in the initial aligned position on a repetitive basis to determine the most significant digit of the quotient, (3) aligning the divisor with the remainder dividend by digitally shifting the divisor one digit to the right, (4) subtracting the divisor from the dividend in the second aligned position on a repetitive basis to determine the second most significant digit of the quotient, and (5) repetitively aligning the divisor with the remainder dividend by digitally shifting the divisor one digit to the right and subtracting the divisor from the dividend in each aligned position to determine successive digits of the quotient until the divisor has been subtracted from the dividend to determine the least significant digit of the quotient.

Other objects and advantages of the invention will become apparent as the following description proceeds, taken in conjunction with the accompanying drawings, in which.

Figure 1:
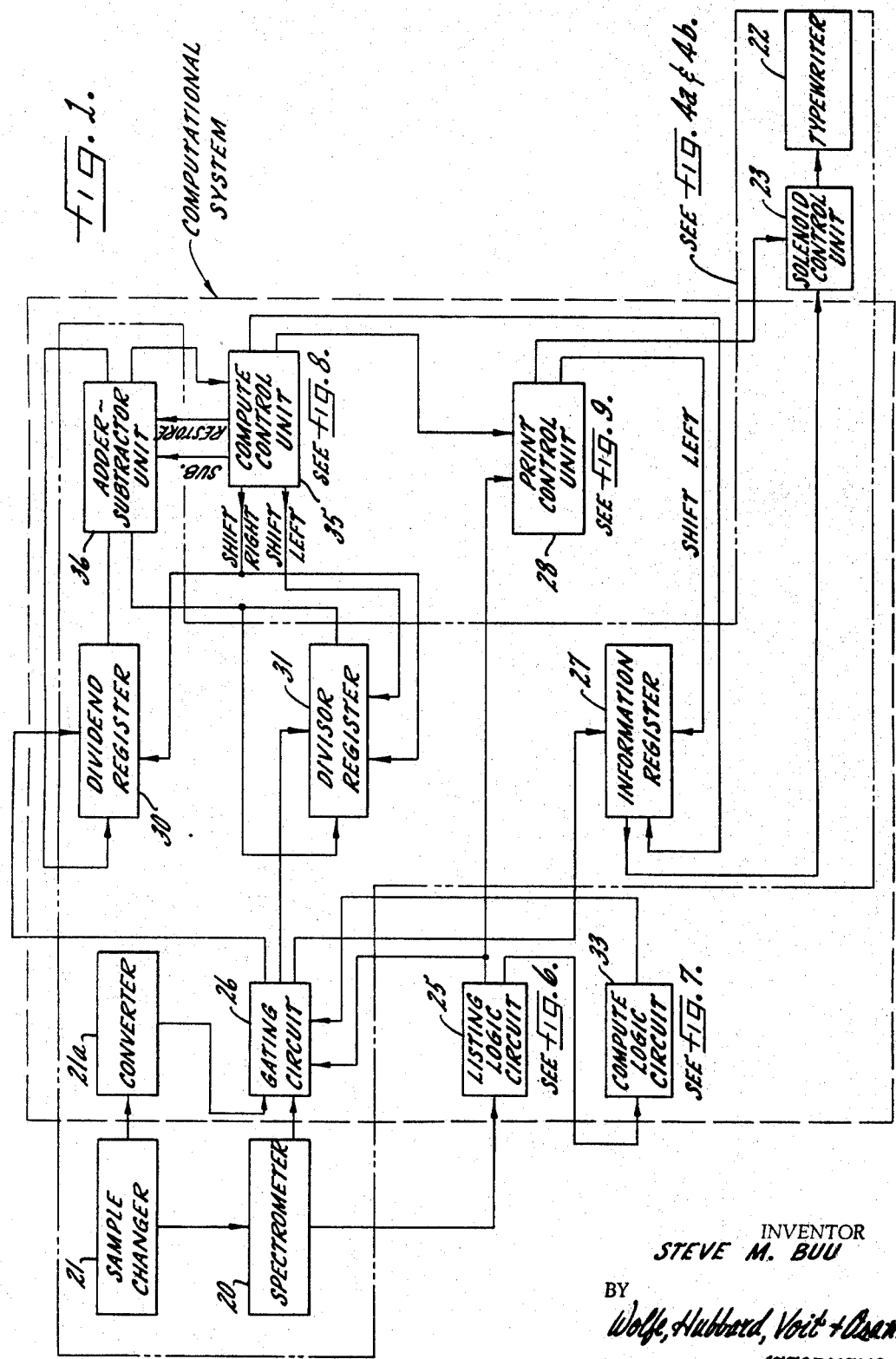
FIG. 1 is a block diagram of an exemplary data processing system embodying the principles of the present invention.

FIGS. 4a and 4b when combined form a more detailed block diagram of the computing and "print-out" portions of the exemplary system shown in FIG. 1;

FIG. 5 is a block diagram of a typical one of the gate circuits shown in FIG. 4;

FIG. 6 is a more detailed block diagram of the listing logic circuit shown in FIG. 1;

FIG. 7 is a more detailed block diagram of the compute logic circuit shown in FIG. 1;

FIG. 8 is a more detailed block diagram of the compute control unit shown in FIG. 1;

FIG. 9 is a more detailed block diagram of the print control unit shown in FIG. 1; and FIG. 10 is a perspective view showing the relationship between a typewriter key and associated solenoid control apparatus illustrated in simplified form in FIG. 4.

While the invention has been shown and will be described in some detail with reference to a specific exemplary embodiment thereof, there is no intention that it be limited to such detail. On the contrary, it is intended here to embrace all modifications, alternatives and equivalents as are included within the spirit and scope of the invention as defined by the appended claims.

In order to facilitate a complete understanding of the present invention, an exemplary system for processing data representative of observed or measured characteristics of radioactive test samples will be described below. However, it is merely intended to illustrate one environment in which the invention will find particularly advantageous use, and it is to be understood that the invention may find use in conjunction with the processing of any desired data.

In various ones of the drawings, flip-flops, AND gates and OR gates have been symbolically illustrated. Since these elements are conventional and are commonly utilized in the electronics art, the details thereof have not been set forth. However, a brief description of the operation of the flip-flops may be helpful in understanding the operation of the present invention.

The flip-flops are illustrated as rectangles having two sections, one being identified by the reference character "S" and the other by the reference character "R." Inputs to the flip-flops are connected to the left-hand sides thereof and outputs are connected to the right-hand sides thereof. Some of the flip-flops are of the monostable type designated by the characters "MS," whereas the remaining flip-flops are of the bistable type. When an input signal or pulse as applied to the "S" section of a monostable flip-flop, the flip-flop is set and, after a predetermined time period, the flip-flop resets itself in a conventional manner. During such operation of a monostable flip-flop, desired output pulses are selectively produced at the "S" and "R" output terminals. When an input signal or pulse is applied to the "S" section of a bistable flip-flop, the latter is set and desired output signals are selectively produced at the "S" and "R" output terminals. Subsequently, when an input signal or pulse is applied to the "R" section of a bistable flip-flop, the flip-flop is reset and desired output signals are selectively produced at the "S" and "R" output terminals.

Environment of invention

Before treating the present invention in detail, it will be helpful first to consider briefly the exemplary environment in which the invention finds particular, but by no means exclusive, use. In radioactivity measurements, it is frequently an objective to determine the rate at which decay events in a radioactive isotope present in a test sample occurs, this rate generally being expressed as counts per unit time, e.g., counts per minute. The quantity of a particular isotope present in a radioactive source is, in general, proportional to the rate of decay events produced by the isotope, such rate being termed the "activity level" of the source. Generally, the decay events or radiation emanations from a radioactive source are, for purposes of measurement or counting, converted into corresponding voltage pulses which can then be counted. The pulses may be counted for a predetermined time period ("preset time" operation) or the time necessary to receive a predetermined number of pulses may be measured ("preset count" operation), the ratio of counted pulses to the elapsed time period being indicative of the activity level.

For the purpose of this description, it will be assumed that a scintillation spectrometer is used such as that illustrated and described in U.S. Letters Patent 3,114,835 to Lyle E. Packard and assigned to the assignee of the present invention. However, the particular spectrometer used is not critical to the invention and, therefore, the details of such an exemplary spectrometer will not be set forth hereinbelow, but rather a general description thereof will be given. The environmental spectrometer is a liquid scintillation counting system which can be used in conjunction with any automatic, semi-automatic or manual sample changer for selectively conveying radioactive samples to a radioactivity detecting and measuring station in seriatim order and where decay events occurring in each sample are then counted in either "preset time" or "preset count" operation so as to provide an indication of the energy level of the test sample.

A typical automatic sample changer that can be utilized in conjunction with such a spectrometer is illustrated in the copending application of Lyle E. Packard, Alfred E. Munn, Roy E. Smith and Edward F. Polic, Ser. No. 273,189, filed Apr. 15, 1963, now Patent No. 3,257,561, and assigned to the assignee of the present invention. Such a sample changer may be loaded with any desired number of sample trays, each having stations for receiving twenty-four radioactive samples. The sample changer sequentially conveys selected ones of the trays to an indexing station where the samples on each tray are sequentially conveyed to the measuring and detecting station one at a time. The sample changer includes a rotary wafer switch which produces an output representative of the number of the sample in a tray at the indexing station upon which the desired measuring and detecting operation is being performed. This output may be transmitted to a converter which produces desired data representative of the sample number "#."

In actual practice, the spectrometer may be programmed to produce, for example, data representative of the following:

(1) The counting time "T"
(2) The count recorded on a "red" scaler "R"
(3) The count recorded on a "green" scaler "G"
(4) The count recorded on a "blue" scaler "B"

The terms "red," "green" and "blue" scalers are utilized to indicate the count attained in different channels of the spectrometer. Accordingly, for the purpose of this description, it will be assumed that a three channel spectrometer is utilized. While the exemplary spectrometer in the above-described Patent 3,114,835 is a two channel spectrometer, it is clearly disclosed therein that a greater number of channels may be utilized and reference may be made thereto for the details of a three channel spectrometer.

The data produced by the converter and the spectrometer is then transmitted to a desired "print-out" system so that composite numbers corresponding to the data are printed-out on a desired record sheet. In addition to the foregoing data, it is often desirable to "print-out" composite numbers representative of the counts per unit time for each scaler, i.e., the ratio of the scaler counts to the counting time, and representative of various possible ratios of the scaler counts. Consequently, a computational system must be provided for performing the desired dividing operations and for transmitting the resultant data to the "print-out" system.

Data processing system

In accordance with one aspect of the present invention, a data processing system is provided for causing desired data to be selectively printed-out. More specifically, a data processing system is provided for processing data representative of particular specified characteristics of radioactive samples and which is (1) capable of selectively and automatically performing specified divisional operations and (2) capable of causing such observed and calculated data to be selectively printed-out on a record sheet.

Referring to FIGURE 1, an exemplary arrangement of such a data processing system is shown. For the purpose of producing numerical output data representative of particular characteristics of radioactive test samples, a spectrometer 20, a radioactive sample changer 21 and a converter 21a have been provided which may simply take the form of the aforementioned exemplary scintillation spectrometer and sample changer and converter. For the purpose of this description, it will be assumed that numerical output data is produced by the converter 21a and the spectrometer 20 which is representative of the following:

(1) The sample number "#"
(2) The counting time "T"
(3) The count on the "red" scaler "R"
(4) The count on the "green" scaler "G"
(5) The count on the "blue" scaler "B"

For the purpose of printing-out the desired data, a typewriter 22 has been provided. In the interest of compactness, the typewriter is preferably an "IBM Selectric" typewriter, wherein the carriage does not move relative to the keys, but rather a ball type printing head is moved relative to the carriage. A solenoid control unit 23 has been provided for controlling the operation of the typewriter 22 in accordance with the transmission thereto of desired data.

As previously mentioned, it is desirable to selectively "print-out" composite numbers corresponding to the data produced by the converter and spectrometer. For the purpose of controlling printing-out of the data, a listing logic circuit 25 has been provided. In response to the completion of a detecting and measuring operation for a given radioactive sample, a signal is transmitted from the spectrometer 20 to the listing logic circuit 25 causing the listing logic circuit to be rendered operative. The listing logic circuit controls the operation of a gating circuit 26 so that the numerical output data produced by the converter 21a and spectrometer 20 is selectively transmitted to an information register 27. In other words, the numerical data representative of the different characteristics is transmitted to the information register 27 and stored therein at different times during a cycle of operation. Subsequent to the storage of data in the information register 27, for example, the data from the converter 21a representative of the sample number, a signal is transmitted from the listing logic circuit 25 to a print control circuit 28 causing the print control circuit to be rendered operative. The print control circuit, in turn, conditions the solenoid control unit 23 for operation and causes the data stored in the information register 27 to be digitally and sequentially read out from the information register and transmitted to the solenoid control unit. In response thereto, the solenoid control unit 23 controls the operation of the typewriter 22 so that a composite number represented by the data in the information register 27 is printed-out. Data representative of the most significant digit of the composite number is the first to be transmitted to the solenoid control unit and printed-out by the typewriter, whereas data representative of the least significant digit is the last to be transmitted to the solenoid control unit and printed-out.

Subsequent to the printing-out of the composite number representative of the sample number, the listing logic circuit 25 controls the operations of the gating circuit 26 and the print control circuit 28 so that composite numbers representative of the time of count, the count on the "red" scaler, the count on the "green" scaler and the count on the "blue" scaler are sequentially printed-out by the typewriter 22.

As previously mentioned, it is also desirable to produce composite numbers representative of the counts per unit time for each scaler and representative of ratios between selected ones of the scalers. For the purpose of performing the desired division operations between selected numerical data produced by the spectrometer 20, a computational system must be provided. In accordance with another aspect of the present invention, a new and improved computational system has been provided for performing the desired divisional operations and for controlling the operation of the typewriter 22 in accordance with the resultant data produced. More specifically, a new and improved computational system has been provided for performing a desired divisional operation by performing the following steps:

(1) Initially aligning the divisor with the dividend by digitally shifting it to the left to the last position at which the value of the dividend is greater than the value of the divisor, (2) Subtracting the divisor digits from the corresponding dividend digits in the initial aligned position on a repetitive basis to determine the most significant digit of the quotient.

(3) Aligning the divisor with the remainder dividend by digitally shifting the divisor one digit to the right, (4) Subtracting the divisor from the dividend in the second aligned position on a repetitive basis to determine the second most significant digit of the quotient, and (5) Repetitively aligning the divisor with the remainder dividend by digitally shifting the divisor one digit to the right and subtracting the divisor from the dividend in each aligned position to determine successive digits of the quotient until the divisor has been subtracted from the dividend to determine the least significant digit of the quotient.

For the purpose of storing numerical data representative of a particular dividend and numerical data representative of a particular divisor, a dividend register 30 and a divisor register 31 have been provided. To control the transmission of data from the spectrometer 20 to the registers 30 and 31, a compute logic circuit 33 has also been provided. The compute logic circuit 33 controls the operation of the gating circuit 26 so that data from the spectrometer is selectively transmitted to the dividend register 30 and the divisor register 31. As will become readily apparent, the compute logic circuit 33 may be preprogrammed by an operator to selectively and sequentially control the following transmission of data:

(1) Data "R" representative of the "red" scaler count to the dividend register 30 and data "T" representative of the counting time to the divisor register 31;

(2) Data "G" representative of the "green" scaler count to the dividend register and data "T" representative of the counting time to the divisor register;

(3) Data "B" representative of the "blue" scaler count to the dividend register and data "T" representative of the counting time to the divisor register;

(4) Data "R" representative of the "red" scaler count to one of the registers and data "G" representative of the "green" scaler count to the other register;

(5) Data "R" representative of the "red" scaler count to one of the registers and data "B" representative of the "blue" scaler count to the other register; and (6) Data "G" representative of the "green" scaler count to one of the registers and data "B" representative of the "blue" scaler count to the other register.

Subsequent to the storage of data in the dividend register 30 and the divisor register 31, a compute control unit 35 is rendered operative to control the performance of the desired divisional operation. First, the compute control unit controls the aligning of the divisor data with the dividend data. During this aligning operation, the compute control unit initially causes the numerical data stored in the registers 30 and 31 to be transmitted to an adder-subtractor unit 36 wherein the divisor data is subtracted from the dividend data. The resultant answer produced by the adder-subtractor unit is then transmitted to the dividend register 30 wherein it is stored, the numerical data stored in the dividend register thus being reduced in value. During the subtraction operation, the numerical data transmitted from the divisor register 31 to the adder-subtractor unit 36 is fed back into the divisor register via a feedback loop so that it is restored therein and the value thereof remains the same. When a positive answer is produced by the adder-subtractor unit during such a subtracting operation, the compute control unit 35 is rendered operative (1) to cause the numerical data stored in the registers to again be transmitted to the adder-subtractor unit 36 wherein an adding operation is performed so that the numerical data stored in the dividend register 30 is restored to its initial value, (2) to digitally shift the numerical data stored in the divisor register 31 one digit to the left so that the value thereof is increased by a multiple of ten, and (3) to repeat the subtraction operation between the dividend data and the divisor data.

The foregoing addition and subtraction operations are performed rapidly on a repetitive basis until such time that a negative answer is produced by the adder-subtractor unit 36. Such a negative answer is an indication that the divisor data can then be aligned with the dividend data simply by shifting the former one digit to the right. In responsive to the negative answer, the compute control unit 35 is rendered operative (1) to transmit the numerical data in the registers 30 and 31 to the adder-subtractor unit 36 wherein they are added so that the numerical data in the dividend register 30 is restored to its initial value, (2) to digitally shift the numerical data in the divisor register 31 one digit to the right so that the divisor data is aligned with the dividend data, and (3) to control the desired divisional operation. In controlling the desired divisional operation, the compute control unit (1) causes the dividend and the divisor numerical data to be repetitively transmitted to the adder-subtractor unit 36 so that the divisor data is repetitively subtracted from the dividend data, (2) responds to the production of a negative answer to stop the repetitive subtraction operations and to cause the dividend and divisor data to be transmitted to the adder-subtractor unit wherein they are added so that the dividend numerical data is restored to its value prior to the last subtraction operation, (3) digitally shifts the divisor numerical data one digit to the right subsequent to the adding and restoring operation, (4) repeats the foregoing operating steps until the divisor numerical data is returned to its initial position and a negative answer is produced by the adder-subtractor unit, (5) counts the number of subtracting operations performed at each divisor data position prior to the production of a negative answer and causes numerical data representative of the number of subtraction operations performed to be stored in the information register 27, and (6) renders the print control unit 28 operative when the divisor is returned to its initial position and a negative answer is produced by the adder-subtractor unit 36 thus insuring that a composite number represented by the data stored in the information register 27 and representative of a desired ratio is sequentially printed-out by the typewriter 22 on the record sheet.

The foregoing divisional operation is therefore performed for each of the desired ratios and the resultant quotients are sequentially typed out by the typewriter 22.

It will be readily appreciated that, in response to the foregoing operations of the exemplary data processing system shown in FIG. 1, the desired numerical data for a given sample is typed out in seriatim order across a record sheet by the type writer 22. Upon completion of the printing-out of the composite number representative of the last characteristic to be recorded for a given sample, the ball type printing head of the typewriter is returned to its initial position and the typewrited platen is rotated one step to condition the typewriter for a subsequent printing operation on the next line of the record sheet. The numerical data for each additional sample being analyzed is subsequently typed out in seriatim order across the record sheet in like manner so that successive lines typed data on the record sheet are respectively representative of observed and calculated data corresponding to successive different ones of the samples. In this manner, corresponding data for the various samples is disposed in columnar form on the record sheet.

Figures 2, 3:
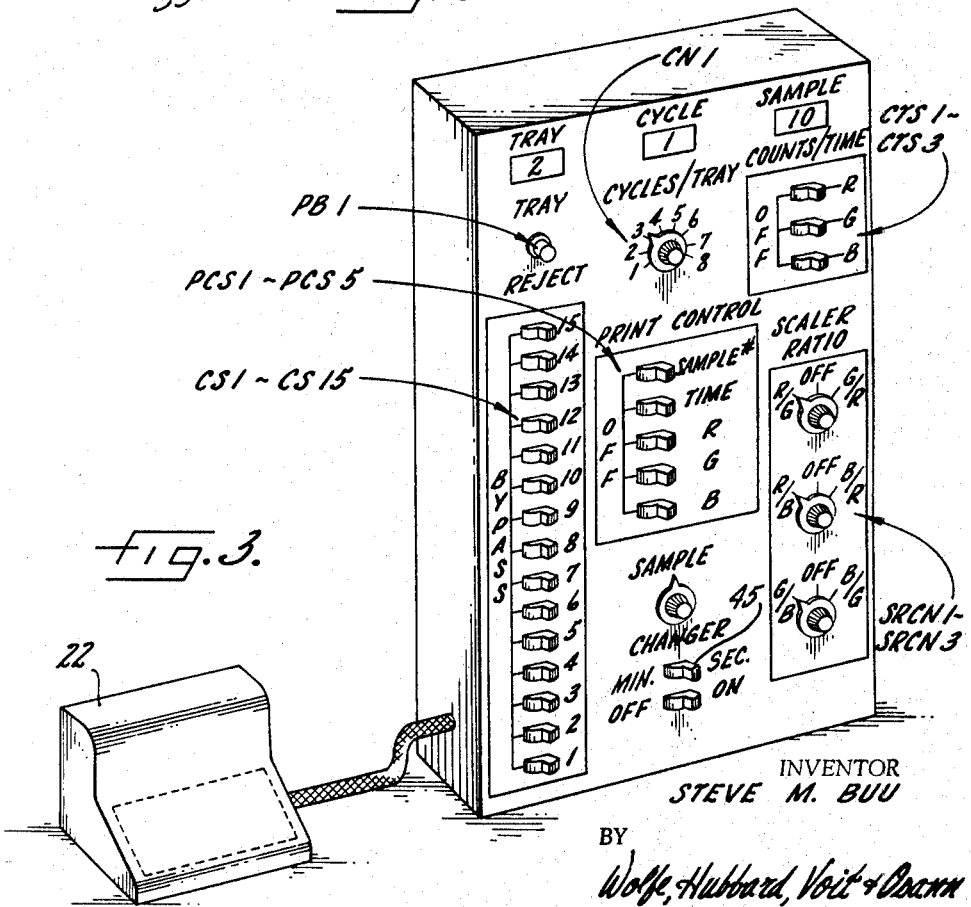
FIG. 2 illustrates a typical record sheet upon which data, processed by the system shown in FIG. 1 and representative of particular observed or calculated pieces or categories of information associated with a radioactive test sample, may be printed.
FIG. 3 is a perspective view of a composite radioactive sample measuring and recording system employing the components shown in FIG. 1.

Referring to FIG. 2, a special record sheet 39 is shown whereupon the observed and calculated numerical data for each sample is printed in seriatim order by the typewriter 22 (FIG. 1) in the exemplary arrangement. As may be seen, specific columns have been provided for the recordation of data representative of the different desired characteristics. Consequently, corresponding data for all of the different samples is disposed in columnar form.

For the purpose of providing a better understanding of the foregoing divisional operation, a typical dividing operation will now be described by way of example wherein the number 456 is divided by the number 2. Thus, consistent with foregoing description, the number 456 is first stored in the divident register 30 as the dividend, while the number 2 is stored in the divisor register 31 as the divisor. Initially, it is necessary to align the dividend and the divisor so as to permit the desired divisional operation to be performed. To accomplish this, the number 2 is first subtracted from the number 456 by the adder-subtracter unit 36 thus leaving a positive remainder of 454. The number 456 is then restored in the dividend register, and the number 2 in the divisor register is digitally shifted one digit to the left thus increasing the divisor by a factor of 10 to the number 20. The divisor number 20 is then subtracted from the dividend number 456, leaving a positive remainder of 436. Thereafter, the number 456 is again restored in the dividend register and the divisor 20 is again digitally shifted one digit to the left thus again increasing the divisor by a factor of 10 to the number 200. The divisor number 200 is now subtracted from the dividend number 456 leaving a positive remainder of 256. Consequently, the number 456 is again restored in the dividend register and the divisor is again digitally shifted one digit to the left thus again increasing the divisor by a factor of 10 to the number 2,000. The divisor 2,000 is now subtracted from the dividend 456 thus producing a negative answer. In response to the production of the negative answer, the number 456 is again restored in the dividend register and the number in the divisor register is shifted one digit to the right thus decreasing the divisor by a factor of 10 and restoring the divisor to the number 200. At this time, the divisor is aligned with the dividend. The divisional operation of the computational system is then initiated.

During the divisional operation, the number 200 is subtracted from the number 456 leaving a positive remainder of 256 which is then stored in the dividend register. At the same time, a count of 1 is registered in compute control unit 35. The subtracting operation is then repeated, leaving a positive remainder of 56 which is stored in the dividend register. The count registered in the compute control unit 35 (which is, of course, a count representative of the number of subtraction steps performed) is now increased to 2, thus indicating that two subtraction operations have been performed with the divisor number of 200. The divisor of 200 is now subtracted from the positive remainder 56, producing a negative answer which is ineffective to increase the count registered in the compute control unit 35 to a count of 3—that is, the count registered in the compute control unit remains at 2. However, since the last subtraction operation produced a negative remainder, the number in the dividend register is now restored to the number 56, the divisor number is again shifted digtally one digit to the right, decreasing the divisor by a factor of 10 to the number 20, and the previously attained or calculated count of 2 in the compute control unit 35 is stored in the information register 27 as the most signficant digit of the quotient. The foregoing subtracting operations are again repetitively performed with a divisor of 20 and a stored dividend which is initially 56. It will be apparent that during the third subtraction operation a negative answer is again produced. In this instance, the positive remainder 16 is restored in the dividend register 30, and the number in the divisor register 31 is again digitally shifted one digit to the right, decreasing the divisor by a factor of 10 to the number 2. The count of 2 which has been attained in the compute control unit 35 is stored in the information register 27 as the second most significant digit of the quotient. Subsequently, subtracting operations are again repetitively performed, this with an initial dividend of 16 and a divisor of 2. It follows that during the ninth subsequent subtraction operation (i.e., when 2 is subtracted from 40) a negative answer is porduced. When this negative answer is produced, the computational system is rendered inoperative since, at this time, the divisor will have been restored to its initial position and no further digital shift to the right is possible. A count of 8 will have been attained in compute control unit 35 during the latter subtratcion operations (since the divisor 2 can be subtracted from the dividend 16 eight times without having leaving a negaitve remainder) and this count is stored in the information register 27 as the least significant digit of the quotient. Consequently, a quotient of 228 has been stored in the information register 27. Moreover, the quotient 228 will thereafter be printed out by the typewriter 22 on the record sheet 39 so that a permanent record thereof is provided.

Referring now to FIG. 3, there has been illustrated an exemplary data processing apparatus including a typewriter 22 and a console housing the spectrometer 20 and the computational system depicted in block form in FIG. 1. As may be seen, provision is made in the console for providing a visual indication of (1) the number of the tray which is at the indexing station in the sample changer. (2) the cycle of the detecting and measuring operation being performed on the samples in the tray, and (3) the number of the particular sample in the tray which is presently being measured. For the purpose of permitting a tray to be selectively rejected when the latter is located in the indexing station, a tray reject push PB1 has been provided. In order to allow all of the samples in each tray to be counted a selected number of times, a manually operable cycles per tray switch having a control knob CN1 has been provided. Additionally, it will be observed that control switches CS1–CS15 have been provided for the purpose of permitting manual selection by an operator of a particular one, or ones, of the trays of samples stored in the exemplary sample changer 21 (FIG. 1), so as to enable the selected trays to be sequentially conveyed to a tray indexing station from which the individual samples are transferred one at a time in sequential order to and from a radiation detection and measuring station. Print control switches PCS1–PCS5 have also been provided for conditioning the system to print out data produced by the converter 21a and the spectrometer 20 (FIG. 1), which data is representative of selected characteristics for each sample. Additionally, count per unit time control switches CTS1–CTS3 are provided for conditioning the system to perform selected division operations representative of the ratio of counts recorded in each of the "red," "green" and "blue" scalers to the count time, such selected calculated ratios then being printed out on the record sheet 39 shown in FIG. 2. Finally, scaler ratio control knobs SRCN1–SRCN3 are provided for conditioning the system to perform calculations of the ratios between selected scaler counts and for causing the resultant data to be printed out. In view of the foregoing, it will be readily appreciated that means have been provided for preprogramming the exemplary data processing system to print out numerical data representative of a selected one, or ones, of designated characteristics or information categories pertaining to radioactive samples stored in selected ones of the trays positioned on the sample changer 21 (FIG. 1).

Computing and printing out portions of computational system

Referring to FIGS. 4a and 4b, the computing and printing out portions of the illustrative data processing system (i.e., the portions enclosed by the broken line in FIG. 1) are disclosed in somewhat more detailed block form. With reference thereto, it will be observed that the exemplary spectrometer 20 and the converter 21a provide numerical data inputs for the gating circuit 26, such inputs being representative of the selected information categories for each sample. Thus, sample number "#," time "T" and recorded counts "R," "G," and "B" in each of the scalers are transmitted to the gating circuit 26 as numerical data in the form of binary coded decimal signals. In other words, each digit of the numerical data is represented by a four bit binary coded output. Additionally, the numerical data representative of a given sample information category will have a plurality of digits and, for the purpose of this description, it will be assumed that each information category or characteristic is represented by a ten digit number. Since, as previously mentioned, it is assumed for purposes of this description that numerical data representative of five characteristics ("#," "T," "R," "G" and "B") can be produced for each sample, it follows that the exemplary system can produce up to fifty four bit binary coded outputs for each sample.

The exemplary dividend register 30, wherein data representative of a particular dividend is to be stored, is shown in FIGS. 4a and 4b as including four shift registers SR1A–SR4A. In like manner, the divisor register 31, wherein data representative of a particular divisor is to be stored, is illustrated as including four shift registers SR1B–SR4B, while exemplary information register 27, wherein data to be printed-out is to be stored, is depicted as including four shift registers SR1C–SR4C. Each of the shift registers in the dividend, divisor and information registers is provided for the purpose of storing one bit of the binary coded output data for each digit of the numerical data representative of a selected characteristic for a given sample. Since it has been assumed that ten digit numerical data is produced by the spectrometer 20 for each characteristic, and further assuming that it is desired to print-out all of the digits for each characteristic, the shift registers have been provided with ten stages, each stage having an independent input for the storage of a bit of binary coded data therein.

As previously mentioned, the gating circuit 26 is provided for controlling the transmission of data from the spectrometer to the dividend, divisor and information registers. In FIGS. 4a and 4b, the gating circuit 26 is disclosed as including forty gate circuits, only three of the gate circuits actually being shown. A corresponding bit of the binary coded output data for a corresponding digit of the ten digit numerical data representative of each characteristic is transmitted from the spectrometer 20 or converter 21a to each of the gate circuits so that each gate circuit controls the transmission of a selected one of the bits of the binary coded output data to a prescribed stage in an associated one of the shift registers. For example, the first bit of the first digit for each of the characteristics is transmitted from the spectrometer to a gate circuit GC–1D–1B which selectively controls the transmission of a bit to either (1) the first (least significant) stage of the first bit shift register SR1A in the dividend register 30, (2) the first stage of the first bit shift register SR1B in the divisor register 31, or (3) the first stage of the first bit shift register SR1C in the information register 27. The remaining gate circuits, in like manner, selectively control the transmission of bits of the binary coded output data to other prescribed stages of the associated shift registers. As will become apparent, the operations of the gate circuits GC–1D–1B to GC–XD–4B are concurrently controlled so that, during a controlling operation, all of the binary coded output data bits for a selected characteristic are concurrently stored in the shift registers of the dividend register 30, the divisor register 31, or the information register 27. During such a storing operation, the first bit of the binary coded output data for each digit of a selected characteristic is stored in the first bit shift register, the second bit for each digit is stored in the second bit shift register, the third bit for each digit is stored in the third bit shift register and the fourth bit for each digit is stored in the fourth bit shift register.

For the purpose of providing a better understanding of the operation of the gate circuits GC–1D–1B to GC–XD–4B, reference is made to FIG. 5 wherein a more detailed block diagram of a typical gate circuit is depicted. As may be seen, the illustrative gate circuit includes five input AND gates AND#, ANDT, ANDR, ANDG and ANDB which control the transmission of bits of data from the spectrometer 20 and the converter 21a through a gate OR1 to output control gates ANDSR–A, ANDSR–B and ANDSR–C in accordance with the operation of the listing logic circuit 25 and the compute logic circuit 33 (FIG. 1). The transmission of the data bits through the output gates ANDSR–A, ANDSR–B and ANDSR–C is also controlled by the listing logic circuit 25 and the compute logic circuit 33. The gate ANDSR–A is associated with a prescribed stage of an associated shift register in the dividend register 30 so that, when gate ANDSR–A is opened, a data bit is controllably stored therein; the gate ANDSR–B is associated with a prescribed stage of an associated shift register in the divisor register 31 so that, when gate ANDSR–B is opened, a data bit is controllably stored therein; and the gate ANDSR–C is, in like manner, associated with a prescribed stage of an associated shift register in the information register 27 so that, when gate ANDSR–C is opened, a data bit is controllably stored therein.

During a listing operation, the listing logic circuit 25 (FIG. 6) controls the operation of the gate circuits in the gating circuit 26. Control signals are sequentially transmitted from the listing logic circuit 25 to succeeding ones of the input gates AND#, ANDT, ANDR, ANDG and ANDB with prescribed time intervals existing therebetween so that the input gates are sequentially opened. At the same time, a control signal is transmitted from a flip-flop FF1 in the listing logic circuit to the output control gate ANDSR–C so that the output control gate is opened. All the gate circuits in the gating circuit are likewise controlled so that bits of binary coded output data representative of the sample number are initially stored in the shift registers of the information register 27 at the end of a first time interval and the numerical value thereof is subsequently printed-out by the typewriter 22 is the associated print control switch PCS1 (FIG. 3) is preset for a print-out operation. At the end of succeeding, prescribed time intervals, bits of binary coded output data respectively representative of the time of count, count in the "red" scaler, count in the "green" scaler and count in the "blue" scaler are stored in the shift registers of the information register 27 and thereafter the numerical values thereof are selectively printed-out by the typewriter 22, depending on the preset state of print control switches PCS2–PCS5. Thus, the listing logic circuit 25 controls the operation of the gate circuits in the gating circuit 26 so that composite numbers representative of the sample number and the selected sample characteristics detected and measured by the spectrometer 20 are selectively and sequentially printed-out by the typewriter 22 in seriatim order across the recordation sheet shown in FIG. 2.

During a dividing operation, the operation of the gate circuits in the gating circuit 26 are controlled by the compute logic circuit 33 (FIG. 7). For the purpose of providing a description of a typical operation, it will be assumed that it is desired to print-out a composite number representative of the count "R" in the "red" scaler divided by the time "T" of the count. For this operation, the binary coded output data representative of the count in the "red" scaler must be stored in the dividend register 30, whereas the binary coded output data representative of the time of the count must be stored in the divisor register 31. With reference to the exemplary gate circuit shown in FIG. 5, a control signal is initially transmitted from the compute logic circuit 33 to the gate ANDR causing the gate to be opened so that a bit of the data representative of the "red" scaler count "R" is transmitted therethrough and through the gate OR1 to the inputs of the output control gates ANDSR–A, ANDSR–B and ANDSR–C. At the same time, a control signal is transmitted from the compute logic circuit to the gate ANDSR–A causing it to be opened so that the bit of "red" scaler count data is transmitted therethrough to the prescribed stage of the associated shift register in the dividend register 30 wherein it is stored. All of the gate circuits in the gating circuit 26 are correspondingly rendered operative so that all of the bits of binary coded output data representative of the "red" scaler count are concurrently stored in the shift registers of the dividend register 30. Subsequently, at the end of a prescribed time interval, a control signal is transmitted from the compute logic circuit 33 to the gate ANDT so that a bit of the data representative of the counting time "T" is transmitted therethrough and through the gate OR1 to the inputs of the output control gates ANDSR–A, ANDSR–B and ANDSR–C. At the same time, a control signal is transmitted from the compute logic circuit to the gate ANDSR–B so that the bit of counting time data is transmitted therethrough to the prescribed stage of the associated shift register in the divisor register 31 wherein it is stored. All of the gate circuits in the gating circuit 26 are again correspondingly rendered operative so that all of the bits of binary coded output data representative of the time of count are concurrently stored in the shift registers of the divisor register 31. At this time, the desired dividend data is stored in the dividend register 30 and the desired divisor data is stored in the divisor register 31 so that the desired dividing operation may be performed. Subsequently, at the end of succeeding prescribed time intervals, the same operation is repeated for the numerical data representative of other characteristics between which it is desired to perform division operations, such, for example, as scaler counts divided by the time of count and ratios between scaler counts.

Referring again to FIGS. 4a and 4b conjointly, the operation of the shift registers in conjunction with a printing operation will be briefly discussed. The shift registers are assumed to be conventional units commonly utilized in electronic switching and counting operations and, therefore, the details thereof will not be set forth. Subsequent to the storage of bits of binary coded data representative of a particular characteristic in the shift registers of the information register 27 during operation of the listing logic circuit 25, a control signal is transmitted from the listing logic circuit to the print control unit 28 (FIG. 9), causing the print control unit to be rendered operative to control the printing-out of the data in the information register. The print control unit, in turn, causes a control pulse to be transmitted through terminal "a" in FIG. 4b to the left shift inputs LS of the shift registers SR1C–SR4C of the information register 27. In response thereto, the binary coded data stored in the shift registers SR1C–SR4C is repeatedly shifted to the left in digital steps so that the bits of binary coded data representative of succeeding digits of the data stored in the information register are sequentially read out of the shift registers and are transmitted to a decoder 40. Since the binary coded data stored in the shift registers SR1C–SR4C is repeatedly shifted from right to left, it will be apparent that the data bits representative of the most significant digit of the data stored in the information register 27 are the first to be readout, whereas the data bits representative of the least significant digit thereof are the last to be read out. In response to the transmission thereto of the four bits of binary coded data representative of a given digit of the data stored in the information register 27, the decoder 40 transforms the binary coded output data into straight decimal data. The straight decimal data produced by the decoder 40 is then utilized to control the energization of an associated one of a plurality of solenoids S0–S9 which respectively control the operation of typewriter keys bearing the numbers 0–9 so that a desired number is printed-out. During the time period when the print control unit 28 transmits control pulses through terminal "a" to the left shift inputs LS of the shift registers SR1C–SR4C, the print control unit also transmits a control signal through terminal "b" to a common terminal of the solenoids S0–S9 causing the solenoids to be conditioned for energization in response to the production of a straight decimal signal by the decoder 40.

In view of the foregoing, it follows that the bits of binary coded data representative of each digit of the data stored in the information register 27 are sequentially read out and are decoded so that selected ones of the solenoids S0–S9 are sequentially energized to control the operation of associated keys of the typewriter 22 whereby numbers represented by the bits of binary coded data are sequentially typed out. Thus, a composite number representative of (1) the data produced by the converter 21a or (2) a characteristic detected and measured by the spectrometer 20 is printed-out on the recordation sheet (FIG. 2).

As previously mentioned, bits of binary coded output data representative of the sample number and the various characteristics detected and measured by the spectrometer 20 are stored in the information register 27 at different times during operation of the listing logic circuit 25. Accordingly, the data representative of the various characteristics is transmitted to the decoder 40 at different times so that composite numbers representative of the data are sequentially printed-out by the typewriter in seriatim order on the recordation sheet. To insure that the composite number representative of each characteristic is printed-out in the desired column of the recordation sheet shown in FIG. 2, a control signal is transmitted from the print control unit 28 through terminal "c" in FIG. 4b to a tab control solenoid ST subsequent to the printing-out of a composite number representative of one of the characteristics. In response thereto, the tab control solenoid ST is energized causing an associated tab key of the typewriter to be operated so that the ball like printing head of the typewriter is moved relative to the recordation sheet to a position whereat it is conditioned for printing the composite number of the next succeeding characteristic. Additionally, in the event selected ones of the print control switches PCS1-PCS5 shown in FIG. 3 have been thrown to the "off" position, a tab control signal is transmitted from the print control unit to the tab control solenoid ST when the data representative of a selected characteristic is ready for printing-out so that the typewriter printing head bypasses the column for the characteristic selected to be omitted and is positioned at the next subsequent column in readiness to print-out the composite number for the next succeeding characteristic.

While the details of the decoder 40 have not been shown, it will be readily apparent to those skilled in the art that various conventional circuits capable of transforming binary coded data into straight decimal data may be utilized. For example, a conventional "relay tree" network may be employed for this purpose.

Subsequent to the storage of bits of binary coded output data representative of selected characteristics in the shift registers of the dividend register 30 and the divisor register 31 during operation of the compute logic circuit 33, a dividing operation as previously described in connection with FIG. 1 is performed. During the aligning portion of the dividing operation, a subtract control signal is initially transmitted from the compute control units 35 (FIG. 8) through terminal "d" (FIG. 4b) to the subtract control input of the adder-subtractor unit 36 so that the adder-subtractor unit is conditioned for a subtracting operation. At the same time, control pulses are transmitted from the compute control unit 35 through terminal "e" in FIG. 4b to right shift inputs RS of the shift registers in the dividend and divisor regirters 30 and 31. In response thereto, the binary coded data stored in the shift registers is repetitively shifted to the right in digital steps so that the bits of binary coded data representative of the succeeding digits of the stored characteristics are sequentially read out of the shift registers and are transmitted to the adder-subtractor unit. It will be readily appreciated that the data bits representative of the least significant digits of the stored characteristics are the first to be read out, whereas the data bits representative of the most significant digits are the last to be read out. During the time interval when the binary coded data stored in the shift registers of the divisor register 31 is being sequentially read out, the data is being fed back into the shift registers via feedback loops so that the binary coded data stored in the divisor register 31 is continuously being restored during the aligning portion of the dividing operation. In response to the transmission thereto of the binary coded data from the dividend register 30 and the divisor register 31, the adder-subtractor unit 36 performs a desired subtracting operation and transmits the resultant binary coded data, i.e., the answers, back to the shift registers of the dividend register 30 wherein the resultant data is stored.

In the event the answer produced by the adder-subtractor unit 36 is positive, a "carry" signal having a first polarity and representative thereof is transmitted through terminal "f" (FIGS. 4b, 8) to the compute control unit 35. In response thereto, the compute control unit causes a restore control signal to be transmitted through terminal "g" (FIGS. 4b, 8) to the restore control input of the adder-subtractor unit 36 so that the adder-subtractor unit is conditioned for an adding operation. At the same time, control pulses are again transmitted through terminal "e" to the right shift inputs RS of the shift registers in the dividend and divisor registers 30 and 31 so that the data stored therein is again sequentially read out and transmitted to the adder-subtractor unit 36. During this reading out operation, the data in the divisor register 31 is again being continuously restored via the feedback loop. In response to the transmission of the binary coded data from the register 30 and 31 to the adder-subtractor unit 36, an adding operation is performed and the resultant binary coded data is transmitted to the shift registers of the dividend register 30 wherein it is stored. Consequently, the binary coded data stored in the dividend register 30 is restored to its initial value. Upon completion of this restoring operation, a control pulse is transmitted from the compute control unit 35 through terminal "h" in FIG. 4b to left shift inputs LS of the shift registers in the divisor register 31, thus causing the data stored in the divisor register 31 to be digitally shifted one digit to the left so that the value thereof is increased by a multiple of ten. Thereafter, the foregoing operations are repeated until a negative answer is produced during a subtracting operation.

When a negative answer is produced by the adder-subtractor unit 36, a carry signal having a second polarity and representative thereof is transmitted through terminal "f" (FIGS. 4b, 8) to the compute control unit 35. In response thereto, a restore control signal is transmitted from the compute control unit through terminal "g" to the adder-subtractor unit 36 causing the adder-subtractor unit to be conditioned for an adding operation. Additionally, control pulses are transmitted from the compute control unit through terminal "e" to the right shift inputs RS of the shift registers in the dividend register 30 and the divisor register 31. Consequently, the binary coded data stored in the dividend register 30 and the divisor register 31 is transmitted to the adder-subtractor unit 36 wherein an addition operation is performed so that the data stored in the dividend register 30 is restored to the value thereof prior to the last subtracting operation. Subsequent to the restoring of the data in the dividend register, a control pulse is transmitted from the compute logic circuit through terminal "i" to the right shift inputs RS of the shift registers in the divisor register 31 so that the data stored therein is digitally shifted one digit to the right.

At this time, the divisor data is aligned with the dividend data and the dividing operation is initiated by the transmission of a subtract control signal from the compute control unit 35 through terminal "d" (FIGS. 4b, 8) to the adder-subtractor unit 36 so that the adder-subtractor unit is conditioned for a substracting operation. Thereafter, control pulses are transmitted from the compute control unit through terminal "e" to the right shift inputs RS of the shift registers in the dividend and divisor registers 30 and 31 so that the data stored therein is sequentially read out into the adder-subtractor unit 36 which subtracts the divisor data from the dividend data and transmits the answer back into the dividend register 30 wherein it is stored. As previously mentioned, the data in the divisor register is restored through the feedback loop during the read out operation. The divisor is repeatedly subtracted from the dividend in this manner until a negative answer is produced by the adder-subtractor unit 36.

When this latter negative answer is produced, a restore control signal is applied to the adder-subtractor unit 36 through terminal "g" by the compute control unit so that the adder-subtractor unit is conditioned for an adding operation. At the same time, control pulses are applied to the right shift inputs RS of the shift registers in the dividend and divisor registers 30 and 31 by the compute control unit through terminal "e" so that the data stored therein is sequentially transmitted to the adder- subtractor unit 36 which performs an adding operation and transmits the answer back to the dividend register 30 wherein it is stored. Consequently, the data stored in the dividend register 30 is restored to the value thereof prior to the last subtracting operation while the data in the divisor register 31 is again restored via the feedback loop. Subsequently, a control pulse is transmitted from the compute control unit through terminal "i" to the right shift inputs RS of the shift registers in the divisor register 31 so that the data stored therein is digitally shifted one digit, i.e., is shifted one stage, to the right whereby the system is conditioned for performing subsequent subtracting operations. At this time, the foregoing subtracting operation is again repeatedly performed until a negative answer is produced by the adder-subtractor unit. When this latter negative answer is produced, the data in the dividend register is restored to its value prior to the last subtracting operation and the data in the divisor register 31 is again digitally shifted one digit to the right to condition the system for a subsequent subtracting operation. The foregoing operations are continued until the number of times the data in the divisor register 31 is shifted digitally to the right equals the number of times that it was previously shifted digitally to the left and a negative answer is produced by the adder-subtractor unit 36, at which time the operation of the system is stopped indicating the completion of the dividing operation.

For each repetitive subtraction operation performed leaving a positive remainder in the dividend during the division operation, a count pulse is transmitted from the compute control unit 35 through terminal "j" to a "Q" input unit wherein a count is stored indicating the number of subtracting operations performed at any given divisor data position. The "Q" input unit transforms the stored count from straight decimal form into binary coded decimal form. Upon production of a negative answer by the adder-subtractor unit 36 and when a control pulse is transmitted from the compute control unit through terminal "i" to the right shift inputs RS of the shift registers in the divisor register 31, the same control pulse is transmitted through terminal "i" to a shift and reset input SR of the "Q" input unit, thus causing the binary coded data stored therein to be read out and transmitted to the shift registers of the information register 27 wherein this binary coded data is stored as a digit of the particular quotient being calculated.

When the number of times the divisor data is digitally shifted to the right equals the number of times it was previously shifted digitally to the left (i.e., during the aligning operation) and when a negative answer is produced by the adder-subtractor unit 36, the binary coded data stored in the shift registers of the information register 27 is representative of the quotient produced by dividing the selected divisor data into the selected dividend data. Thereafter, control pulses are transmitted from the print control unit 28 (FIG. 9) through terminal "a" (FIG. 4b) to the left shift inputs LS of the shift registers in the information register 27 so that the data therein is sequentially read out and is transmitted to the decoder 40. The data representative of the most significant digit of the quotient is the first to be read out, whereas the data representative of the least significant digit is the last to be read out. Upon transmission of the numerical data to the decoder 40, particular ones of the solenoids S0–S9 are energized one at a time in the manner previously described, thus causing correspondnig ones of the typewriter keys to be rendered operative one at a time. Consequently, the succeeding digits of the quotient are sequentially typed out on the recordation sheet. Subsequent to the completion of the printing-out of the composite quotient, a tab solenoid control signal is transmitted from the print control unit 28 through terminal "c" (FIG. 4b) to the tab control solenoid ST so that the solenoid is energized and the tab key of the typewriter is operated to position the printing head for printing-out data representative of the next desired ratio. In the event that decimal information is to be printed-out subsequent to the performance of the foregoing dividing operation, a period control signal is transmitted from the print control unit 28 during the time interval between the reading out of those particular digits of the quotient data stored in the information register 27 between which a period is to be positioned. The period control signal is transmitted through terminal "k" (FIGS. 4b, 9) to a period control solenoid SP (FIG. 4a), thereby energizing the latter and causing the period key in the typewriter 22 to be operated so that a period is printed between the desired digits.

It will be readily appreciated that the foregoing dividing operation is performed for each of the selected ratios so that numerical data representative of each desired ratio is likewise printed-out on the recordation sheet, the numerical data for all the ratios being printed-out in seriatim order in the desired columns of the recordation sheet (FIG. 2). Consequently, for each sample being analyzed, numerical data representative of selected ones of the characteristics measured by the spectrometer 20 and numerical data representative of the ratios between selected ones of the characteristics measured by the spectrometer 20 are printed-out in seriatim order in desired columns of the recordation sheet. Subsequent to the printing-out of all the desired data for a given sample, a carriage shift control signal is transmitted from the compute logic circuit 33 (FIG. 7) through terminal "l" into a carriage shift control solenoid SCS (FIG. 4a), thereby energizing the latter and causing the carriage shift key on the typewriter to be operated. In response to operation of the carriage shift key, the carriage or platen is rotated one step so that the recordation sheet is positioned for receipt of the desired data for the next sample to be tested and measured and the printing head of the typewriter is positioned for printing-out the numerical data representative of the first characteristic which, in the exemplary arrangement, is the sample number.

The details of the adder-subtractor unit 36 have not been set forth herein since it is a conventional unit for adding and subtracting binary coded numbers. However, reference may be made to pages 491–497 of the text Digital Computer and Control Engineering by Robert S. Ledley, published by McGraw-Hill (1960), for the details of a typical unit of this type.

Listing logic circuit

Referring to FIG. 6, there is illustrated a more detailed block diagram of the listing logic circuit 25 which serves to cause selected ones of the detected and measured characteristics of the various samples to be serially printed-out by the typewriter 22 on the recordation sheet.

For the purpose of controlling the storage of data produced by the converter 21a and the spectrometer 20 in the information register 27 and for controlling the selected printing-out thereof, a pair of shift register counters SRC–1 and SRC–2 and a logic gating circuit LGC–1 have been provided. In the exemplary arrangement, the shift register counter SRC–1 is a six stage counter having its first five stages controllably connected to the logic gating circuit YGC–1. The shift register counter SRC–2, on the other hand, is a four stage counter having its second and third stages controllably connected to the logic gating circuit. As may be seen, the logic gating circuit LGC–1 has ten stages each having an output terminal respectively numbered 1–10. The logic gating circuit LGC–1 is so arranged that output signals are sequentially produced at the output terminals, with desired time intervals therebetween, in accordance with the operations of the shift register counters SRC–1 and SRC–2. For example, when output signals are simultaneously produced at the second stage of the counter SRC–2 and the first stage of the counter SRC–1, an output signal is produced at the first stage output terminal of the logic gating circuit LGC–1. When output signals are simultaneously produced at the third stage of the counter SRC–2 and the first stage of the counter SRC–1, an output signal is produced at the second stage output terminal of the logic gating circuit LGC–1. Likewise, when output signals are simultaneously produced at the second stage of the counter SRC–2 and the second stage of the counter SRC–1, an output signal is produced at the third stage output terminal of the logic gating circuit LGC–1, whereas when output signals are simultaneously produced at the third stage of the counter SRC–2 and the second stage of the counter SRC–1, an output signal is produced at the fourth stage output terminal of the logic gating circuit. In like manner, the second and third stages of the counter SRC–2 respectively combine with (1) the third stage of the counter SRC–1 to control the sequential production of output signals at the fifth and sixth stage output terminals of the gating circuit LGC–1, (2) the fourth stage output of the counter SRC–1 to control the sequential production of output signals at the seventh and eighth stage output terminals of the gating circuit, and (3) the fifh stage output of the counter SRC–1 to control the sequential production of output signals at the ninth and tenth stage output terminals of the gating circuit.

When a new sample is positioned in the radioactivity detecting and measuring station by the sample changer 21 (FIG. 1), a start input pulse is transmitted therefrom to the "S" input of a monostable flip-flop FF2, causing the flip-flop to be set for a prescribed period of time. Consequently, a desired output pulse is produced at the "S" output of the flip-flop FF2 which is transmitted to the "S" input of the flip-flop FF3, thereby causing the flip-flop FF3, in turn, to be driven to the set condition. The flip-flop FF3, being of the bistable type, remains in the set condition until a reset signal is subsequently applied to the "R" input thereof. In response to the flip-flop FF3 being driven to the set condition, desired output signals are produced at the "S" and "R" outputs thereof. The "S" output signal produced by the flip-flop FF3 is transmitted through terminal "m" to the print control unit 28 (FIG. 9) so that the print control unit is thereby conditioned for a print controlling operation. The "R" output signal produced by the flip-flop FF3 is transmitted (1) back to the "S" input of the flip-flop FF3 so as to inhibit the operation thereof in response to a subsequent start input pulse applied to the flip-flop FF2 until the flip-flop FF3 has been reset, (2) to the "S" input of a flip-flop FF4, causing the latter flip-flop to be set so that a desired output signal is produced at the "S" output thereof which is transmitted to a control unit of a gate AND1, opening the latter, (3) to the "S" input of a monostable flip-flop FF5 causing a desired output pulse to be produced at the "S" output thereof, which pulse is then transmitted through a gate OR2 and the gate AND1, and (4) to the "S" input of a flip-flop FF1 causing a desired output signal to be produced at the "S" output thereof which is transmitted to the SR–C control inputs of the gating circuit 26 in FIGS. 4a and 4b (see details of gate circuit in FIG. 5) so that the gating circuit 26 is conditioned to control the sequential transmission of selected data produced by the converter 21a and spectrometer 20 to the shift registers in the information register 27. The pulse transmitted through the gate AND1 is applied to the shift register counter SRC–1 so that, initially, an output signal is transmitted from the first stage thereof to the logic gating circuit LGC–1. The pulse transmitted through the gate AND1 is also applied to the "S" input of a flip-flop FF7 causing the flip-flop to be set so that a desired output signal is produced at the "S" output thereof which is transmitted to a control input of a gate AND2 causing the gate to be opened. Consequently, pulses are permitted to pass through the gate AND2 from an oscillator OSC–1 to the input of the shift register SRC–2, causing output signals to be sequentially produced at the four stages thereof at desired times.

In response to a first pulse from the oscillator OSC–1, an output signal is produced at the first stage output of the counter SRC–2 which is transmitted through terminal "n" to reset inputs R of the shift registers in the information register 27 so that the shift registers are reset to condition the information register 27 for the storage of binary coded data representative of a selected sample characteristic. In response to a second pulse from the oscillator OSC–1, an output signal is produced at the second stage output of the counter SRC–2 which combines with the outpuut signal produced at the first stage output of the shift register counter SRC–1 to cause an output signal to be produced at the first stage output terminal of the logic gating circuit LGC–1. The output signal produced by the logic gating circuit is transmitted to the "#" control inputs of the gating circuit 26 so that the data representative of the sample number is transmitted from the converter 21a to the information register 27 wherein it is stored. In like manner, in response to a third oscillator pulse, an output signal is produced at the third stage output of the counter SRC–2 which combines with the output signal of the first stage of the shift register counter SRC–1 to cause an output signal to be produced at the second stage output terminal of the logic gating circuit LGC–1. The latter output signal produced by the logic gating circuit is transmitted through the print control switch PSC–1 to either (1) the print control input of the print control unit 28 so that the sample number representative of data stored in the information register 27 is printed-out in straight decimal form, or (2) the tab control input of the print control unit 28 so that printing-out of the sample number representative data is bypassed. In response to a fourth pulse from the oscillator OSC–1, an output pulse is produced by the shift register counter SRC–2 which is transmitted to the "R" input of the flip-flop FF7, causing the flip-flop to be reset so that the gate AND2 is closed and the further transmission of pulses from the oscillator to the counter SRC–2 is prohibited until the flip-flop FF7 is again set.

Upon completion of a printing-out operation or a bypassing operation, the print control unit 28 (FIGS. 1 and 9) produces a pulse which is transmitted through terminal "q" (FIGS. 6 and 9), through gates OR2 and AND1 to (1) the input of the shift register counter SRC–1 and (2) the "S" input of the flip-flop FF7. Consequently, an output signal is produced at the second stage output of the counter SRC–1 and pulses from the oscillator OSC–1 are again applied to the input of the counter SRC–2. Accordingly, the counter SRC–2 is swept through another stepping operation during which (1) the information register 27 is reset, (2) the binary coded output data produced by the spectrometer 20 which is representative of the time of count "T" is stored in the information register, (3) numerical data representative of the time of count is printed-out by the typewriter 22 or the tab key of the typewriter is operated to bypass the printing-out of this data, and (4) the further transmission of pulses to the counter SRC–2 is again prohibited.

It follows that the foregoing operation is cyclically repeated so that subsequently (1) numerical data representative of the "red" scaler count "R" is printed-out or bypassed, (2) numerical data representative of the "green" scaler count "G" is printed-out or bypassed, and (3) the numerical data representative of the "blue" scaler count "B" is printed-out or bypassed. Upon printing-out or bypassing of the numerical data representative of the "blue" scaler count, a pulse is again transmitted from the print control unit 28 through terminal "q" (FIGS. 6 and 9) and the gates OR2 and AND1 to the shift register counter SRC–1, causing an output signal to be produced at the sixth stage output thereof, this output signal being designated as the "end list" output signal. In other words, this output signal indicates the completion of the printing-out of numerical data representative of selected ones of the sample characteristics detected and measured by the converter 21a and spectrometer 20. The "end list" signal is transmitted to the "R" inputs of the flip-flops FF3 and FF4 causing the flip-flops to be reset so that the gate AND1 is closed and the listing logic circuit is thereby rendered inoperative until a subsequent start input signal is received from the sample changer indicating the beginning of detecting and measuring operations for a subsequent sample. The "end list" signal is also transmitted to the "R" input of the flip-flop FF1 causing it to be reset so that the gating circuit 26 is no longer conditioned for the transmission of data from the spectrometer 20 to the information register 27. Finally, the "end list" signal is transmitted through terminal "r" to the compute logic circuit 33 (FIG. 7) to initiate the operation thereof.

*Compute logic circuit*

The computer logic circuit 33 shown in more detailed block form in FIG. 7 is similar to the previously described listing logic circuit. However, the compute logic circuit does not control the transmission of data from the spectrometer 20 to the information register 27, but rather controls the transmission of data from the spectrometer to the dividend and divisor registers 30 and 31.

For this purpose, a pair of shift register counters SRC–11 and SRC–12 and a logic gating circuit LGC–11 have been provided. The counter SRC–11 has seven stages, the outputs of the first six stages being connected to the logic gating circuit LGC–11. On the other hand, the counter SRC–12 has four stages with the second and third stage outputs being connected to the logic gating circuit. The logic gating circuit has twelve stages, each having an output terminal respectively numbered 1–12. The combined operation of the counters SRC–11 and SRC–12 and the gating circuit LGC–11 corresponds to that discussed in connection with the listing logic circuit. In other words, output signals are sequentially produced at the twelve output terminals of the logic gating circuit at desired times so that binary coded output data representative of designated characteristics is selectively stored in the dividend and divisor registers 30 and 31 and the desired dividing operations are performed therebetween.

To accomplish this "end list" output signal produced by the listing logic circuit 25 (FIG. 6) transmitted through terminal "r" to the "S" input of a monostable flip-flop FF12, the "end list" signal initiating operation of the compute logic circuit. In response thereto, the flip-flop FF12 is driven to the set condition for a prescribed time period so that a desired output pulse is produced at the "S" output terminal thereof. Such pulse is then applied to the "S" input of a bistable flip-flop FF13 causing the flip-flop FF13 to be set. In response to setting of the flip-flop FF13, an output signal is produced at the "S" output which is transmitted through terminal "m" to the print control unit 28 so as to condition it for operation. Additionally, an output signal is produced at the "R" output of the flip-flop FF13 which is transmitted (1) back to the "S" input of the flip-flop FF13 to inhibit further operation thereof in response to the setting of the flip-flop FF12 by a subsequent "end list" signal from the listing logic circuit until the flip-flop FF13 has been reset, (2) to the "S" input of a flip-flop FF14 causing the latter flip-flop to be set so that an output signal is produced at the "S" output which is applied to a control input of a gate AND11 causing the gate to be opened, and (3) to the "S" input of a monostable flip-flop FF15 causing it to be momentarily set so that a pulse having a prescribed time period is produced thereby which is transmitted through a gate OR12 and the gate AND11. The pulse transmitted through the gate AND11 is transmitted to the input of the shift register counter SRC–11 so that an output signal is produced at the first stage output thereof. The pulse transmitted through the gate AND11 is also transmitted to the "S" input of a flip-flop FF16 causing the latter to be set so that a desired output signal is transmitted from the "S" output to the control input of a gate AND12, thus opening the gate. Consequently, pulses from an oscillator OSC–11 are transmitted through the gate AND12 to the input of the shift register counter SRC–12. In response thereto, output signals are sequentially produced at the four stages of the counter SRC–12 at desired times.

When an output signal is produced at the first stage output of the counter SRC–12, it is transmitted through terminal "t" (FIGS. 4b and 7) to the reset inputs R of the shift registers in the dividend, divisor and information registers 30, 31 and 27 so that these registers are reset to condition them for the storage of desired data. When an output signal is produced at the second stage output of the counter SRC–12, it combines with the first stage output signal produced by the counter SRC–11 to cause an output signal to be produced at the first stage output of the logic gating circuit LGC–11. This latter output signal is transmitted to the R and SR–A control inputs of the gate circuits in the gating circuit 26 (see FIGS. 4a, 4b and 5) so that the binary coded output data produced by the spectrometer 20 which is representative of the "red" scaler count is transmitted to the dividend register 30 wherein it is stored. Subsequently, when the third stage output signal is produced by the counter SRC–12, it combines with the first stage output signal of the counter SRC–11 to cause an output signal to be produced at the second stage output of the logic gating circuit LGC–11. This latter output signal is transmitted to the T and SR–B control inputs of the gate circuits in the gating circuit 26 (FIGS. 4a, 4b and 5) so that the binary coded output data produced by the spectrometer 20 which is representative of the time of count is transmitted to the divisor register 31 wherein it is stored. Thereafter, when the fourth stage output signal is poduced by the counter SRC–12, it is transmitted to the "R" input of the flip-flop FF16 causing it to be reset so that the further transmission of pulses from the oscillator OSC–11 to the counter SRC–12 is prohibited.

The fourth stage output signal produced by the counter SRC–12 is also transmitted through terminal "s" to the compute control unit 35 (FIG. 8) to initiate a dividing operation so that the data representative of the time of count is divided into the data representative of the "red" scaler count and the resultant data is stored in the information register 27 wherefrom it is read out and numerical data representative thereof is printed-out. Upon completion of the dividing and printing-out operations, a signal is transmitted from the print control unit 28 through terminal "q" (FIGS. 7 and 9) and through the gates OR12 and AND11 to (1) the input of the shift register counter SRC–11 and (2) the "S" input of the flip-flop FF16. Consequently, an output signal is produced at the second stage output of the counter SRC–11 and pulses from the oscillator OSC–11 are again applied to the counter SRC–12. Accordingly, the counter SRC–12 is swept through another stepping operation during which (1) the registers 30, 31 and 27 are reset, (2) the binary coded data representative of the "green" scaler count is stored in the dividend register 30, (3) the binary coded data representative of the time of count is stored in the divisor register 31, and (4) the further transmission of pulses to the counter SRC–12 is prohibited and the dividing and printing-out operation is repeated. It follows that the foregoing operation is cyclically repeated so that subsequently (1) numerical data representative of the "blue" scaler count per unit time is printed-out, (2) numerical data representative of a desired ratio between the "red" and "green" scaler counts is printed-out, (3) numerical data representative of a desired ratio between the "red" and "blue" scaler counts is printed-out, and (4) numerical data representative of a desired ratio between the "green" and "blue" scaler counts is printed-out.

As previously mentioned with respect to FIG. 3, control switches CTS1–CTS3 are provided for causing data representative of the quotients of the "red," "green" and "blue" scaler counts divided by the counting time "T" to be selectively provided and printed-out. As may be seen, when these switches CTS1–CTS3 are selectively opened, corresponding signals are not transmitted to the respective "R," "G," and "B" inputs of the gate circuits in the gating circuit 26. Consequently, the "R," "G" and "B" data is not transmitted to the dividend register 30 in response to operation of the logic gating circuit LGC–11 when the associated switches CTS1–CTS3 are open so that data representative of the selected counts per unit time is not produced and printed-out. Thus, the switches CTS1–CTS3 allow for the preprogramming of the system by an operator to selectively print-out data representative of selected scaler counts per unit time.

The previously mentioned control knobs SRCN1–SRCN3 (FIG. 3) control the operation of associated switches so that desired ratios between the scaler counts may be preprogrammed by an operator. As may be seen (1) the switch SRCN1 is operable to reverse the relationship between the "R" and "G" inputs and the SR–A and SR–B inputs of the gate circuits in the gating circuit 26, (2) the switch SRCN2 is operable to reverse the relationship between the "R" and "B" inputs and the SR–A and SR–B inputs, and (3) the switch SRCN3 is operable to reverse the relationship between the "G" and "B" inputs and the SR–A and SR–B inputs. Consequently, the control knobs SRCN1–SRCN3 allow for programming the logic gating circuit LGC–11 to selectively regulate the transmission of data representative of the scaler counts to the dividend register 30 and the divisor register 31 so that data representative of the desired ratios is produced and printed-out.

Subsequent to the completion of the last dividing and printing-out operation, a signal is transmitted from the print control unit 28 through terminal "q" and the gates OR12 and AND11 to the input of the counter SRC–11. Consequently, an output signal is produced at the seventh stage output thereof which is indicative of the end of the desired computing operation. The "end compute" signal is transmitted to the "R" inputs of the flip-flops FF13 and FF14 causing these flip-flops to be reset and thereby causing the compute logic circuit to be rendered inoperative until a subsequent "end list" signal is transmitted to the "S" input of the flip-flop FF12 from the listing logic circuit. The "end compute" signal is also transmitted through terminal "l" to the carriage shift solenoid SCS (FIG. 4a) so that the typewriter carriage is rotated one step, whereby the recordation sheet is positioned for receiving data representative of the characteristics of the next succeeding sample and the printing head is positioned to print-out data representative of the first characteristic, i.e., the sample number in the exemplary arrangement.

*Compute control unit*

As previously mentioned, the compute control unit 35 (FIGS. 1 and 8) is provided for the purpose of controlling the desired divisional operations. More specifically, the compute control unit initially controls the aligning of the data stored in the divisor register 31 with data stored in the dividend register 30 and subsequently controls repeated subtracting operations at each position between the aligned position and the initial position of the divisor whereby the dividing operation is performed. Referring to FIG. 8, the compute control unit is shown in more detailed block form.

As mentioned above with respect to the operation of the compute logic circuit 33 (FIG. 7), a fourth stage output signal is produced by the shift register counter SRC–12 subsequent to the storage of desired data in the dividend and divisor registers 30 and 31 and this signal is transmitted through terminal "s" to the compute control unit to initiate a subtracting operation. As may be seen, this signal is transmitted through terminal "s" to the "S" input of an operation control flip-flop FF21 causing the flip-flop to be set so that a desired output signal is produced at the "S" output thereof. This latter signal is transmitted through terminal "d" to the subtract control input of the adder-subtractor unit 36 (FIG. 4b) causing the adder-subtractor unit to be conditioned for a subtracting operation. The signal from the compute logic circuit transmitted through terminal "s" is also transmitted to the "S" input of a control flip-flop FF20 causing the flip-flop to be set so that a desired output signal is produced at the "S" output thereof which causes a gate AND20 to be opened. When the gate AND20 is opened, pulses from an oscillator OSC–20 are permitted to flow (1) through the gate to the input of a decade counter DC1 and (2) through the gate and terminal "e" to the right shift inputs RS of the shift registers in the dividend register 30 and the divisor register 31 (FIGS. 4a and 4b). In response to the pulses from the oscillator OSC–20, the data stored in the shift registers of the dividend and divisor registers 30 and 31 is repeatedly shifted digitally to the right so that the data stored therein is sequentially read out and is transmitted to the adder-subtractor unit 36 which performs a subracting operation thereon. When ten pulses have been applied to the right shift inputs RS of the shift registers in the dividend and divisor registers 30 and 31 indicating that all of the data stored therein has been sequentially read out, the decade counter DC1 is filled and produces an end shift pulse which is transmitted to the "R" input of the flip-flop FF20 causing the flip-flop to be reset so that the gate AND20 is closed and the further transmission of pulses therethrough to the dividend and divisor registers 30 and 31 is prohibited until the flip-flop FF20 is again set.

Upon the completion of the subtracting operation, a carry signal is transmitted from the adder-subtractor unit 36 (FIG. 4b), (1) through terminal "f" (FIGS. 4b and 8) and an inverter INV1 to an input of a gate AND21 and (2) through terminal "f" directly to an input of a gate AND22. At the same time, the signal produced at the "S" output of the flip-flop FF21 (indicative of a subtracting operation) is transmitted to inputs of the gates AND21 and AND22. The "end shift" signal produced by the decade counter DC1 is likewise transmitted to inputs of the gates AND21 and AND22.

The gates AND21 and AND22 are identical so that they are responsive to the application thereto of the same polarity signals, assumed to be signals of a second polarity in the exemplary arrangement. However, since the inverter INV1, which reverses the polarity of a signal applied thereto, is interposed between the gate AND21 and terminal "f," the effective polarity of a carry signal transmitted to the gates AND21 and AND22 is different so that, for a given polarity carry signal, only one of the gates is rendered operative. Assuming that a carry signal of a first polarity is transmitted through terminal "f" which is thus indicative of the production of a positive answer by the adder-subtractor unit 36, the signal is reversed to a second polarity signal by the inverter INV1 so that the gate AND21 is rendered operative to produce a signal at the output thereof which is transmitted to inputs of gates AND23 and AND24, whereas the gate AND22 is ineffective to produce an output signal.

Transmission of the signal produced at the output of gate AND21 through the gates AND23 and AND24 is controlled by a flip-flop FF22, the "S" output thereof being connected to a control input of the gate AND24, whereas the "R" output thereof is connected to a control input of the gate AND23. As may be seen, the "S" input of the flip-flop FF22 is connected to terminal "s" and, therefore, the flip-flop FF22 will have been driven to the set condition by the signal produced at the fourth stage output of the shift register SRC–12 in the compute logic circuit 33 (FIG. 7) which initiated operation of the compute control unit. Consequently, a desired output is produced at the "S" output of the flip-flop FF22 causing the gate AND24 to be open so that the signal from the gate AND21 is transmitted (1) through the gate AND24 and a gate OR20 to the "S" input of a monostable restore flip-flop FF23, and (2) through the gate AND24, the gate OR20 and a gate OR21 to the "S" input of a monostable restart flip-flop FF24. In response thereto, the flip-flop FF23 is momentarily set causing a desired output pulse to be produced at the "R" output thereof which is transmitted to the "R" input of the flip-flop FF21 and the flip-flop FF24 is momentarily set causing a desired output pulse to be produced at the "R" output thereof which is transmitted to the "S" input of the flip-flop FF20. As a result, the flip-flop FF21 is reset and a desired output signal is produced at the "R" output of the flip-flop FF21 which is transmitted through terminal "g" (FIGS. 8 and 4b) to the restore control input of the adder-subtractor unit 36 so that the adder-subtractor unit is conditioned for an adding operation. At the same time, the flip-flop FF20 is set, causing a desired output signal to be produced at the "S" output thereof which is transmitted to the gate AND20 causing the gate to again be opened. As a result, pulses from the oscillator 20 are again applied (1) to the decade counter DC1 and (2) to the right shift inputs RS of the shift registers in the dividend and divisor registers 30 and 31 in FIGS. 4a and 4b through terminal "e." Thus, the data stored in the dividend and divisor registers 30 and 31 is again sequentially read out and transmitted to the adder-subtractor unit 36 wherein an adding operation is now performed so that the data stored in the dividend register 30 is restored to its initial value. When ten additional pulses have been produced by the oscillator OSC–20, the decade counter DC1 is again filled to produce an output pulse so that the flip-flop FF20 is again reset and the gate AND20 is again closed to prohibit the further transmission of pulses therethrough to the registers 30 and 31 until the flip-flop FF20 is again set.

At this time, signals are transmitted to the inputs of a gate AND25 from (1) the "S" output of the flip-flop FF22 (2) the "R" output of the flip-flop FF21 (indicative of the restoring operation), and (3) from the output of the decade counter DC1. Consequently, a control pulse is transmitted from the gate AND25 through terminal "h" (FIGS. 8 and 4b) to the left shift inputs LS of the shift registers in the divisor register 31 causing the data stored therein to be digitally shifted one digit to the left so that the value thereof is increased by a multiple of ten. The pulse transmitted through the gate AND25 is also transmitted to a right-left counter RLC1 which attains a count of 1 indicative of the number of times the divisor data has been digitally shifted to the left. Further, the control pulse transmitted through the gate AND25 is transmitted (1) through a gate OR22 to the "S" input of a monostable subtract control flip-flop FF25 causing the latter flip-flop to be momentarily set and (2) through the gates OR22 and OR21 to the "S" input of the monostable restart flip-flop FF24 causing the flip-flop to be momentarily set. As a result, a desired pulse is produced at the "R" output of the flip-flop FF25 which is transmitted to the "S" input of the flip-flop FF21 causing the flip-flop to again be set. Consequently, a desired output signal is produced at the "S" output of the flip-flop FF21 which is transmitted through terminal "d" to the subtract control input of the adder-subtractor unit 36 (FIG. 4b) causing the adder-subtractor unit to be conditioned for a subtracting operation. At the same time, a desired pulse is produced at the "R" output of the flip-flop FF24 which is transmitted to the "S" input of the flip-flop FF20 causing a reading out and subtracting operation to again be initiated. That is, the data in the dividend and divisor registers 30 and 31 is sequentially read out and transmitted to the adder-subtractor unit 36 wherein a subtracting operation is performed. The compute control unit 35 continues to function in the foregoing manner as long as a positive answer is produced during each subtracting operation performed by the adder-subtractor unit 36.

When a negative answer is produced during a subtracting operation performed by the adder-subtractor unit 36, it is indicative of the fact that the data stored in the divisor register 31 has been shifted one digit to the left beyond the position where it is aligned with the data in the dividend register 30. At this time, signals are simultaneously transmitted to the gates AND21 and AND22 from (1) the carry output of the adder-subtractor unit 36, (2) the "S" output of the flip-flop FF21 (indicative of a subtracting operation), and (3) the output of the decade counter DC1. The carry signal produced by the adder-subtractor unit 36, at this time, is of a second polarity so that a desired output signal is provided at the output of the gate AND22, whereas the gate AND21 is ineffective to produce an output signal due to the inverting of the carry signal by the inverter INV1. This latter output signal from the gate AND22 is transmitted through the gate OR20 to the "S" input of the monostable restore flip-flop FF23 causing a desired output pulse to be produced at the "R" output thereof, which is transmitted to the "R" input of the flip-flop FF21, resulting in the flip-flop FF21 being reset. Consequently, a desired control signal is transmitted from the "R" output of the flip-flop FF21 to the restore control input of the adder-subtractor unit 36 (FIG. 4b) so that the adder-substractor unit is now conditioned for an adding operation. The output signal produced at the output of the gate AND22 is also transmitted through gates OR20 and OR21 to the "S" input of the monostable restart flip-flop FF24 so that a desired output pulse is produced at the "R" output thereof, which is transmitted to the "S" input of the flip-flop FF20 causing the latter to be set. It follows then, that the gate AND20 is opened so that pulses from the oscillator OSC–20 are again transmitted to the right shift inputs RS of the shift registers in the dividend register 30 and the divisor register 31. Consequently, the data stored in the registers 30 and 31 is sequentially read out and transmitted to the adder-subtractor unit 36 wherein an adding operation is performed, thus restoring the data stored in the dividend register to the value thereof prior to the last subtracting operation. Finally, the output signal produced at the output of the gate AND22 is transmitted to the "R" input of the flip-flop FF22, causing the flip-flop to be reset so that a desired output signal is produced at the "R" output thereof which is transmitted to the gate AND23. In response thereto, the gate AND23 is opened, whereas gate AND24 is closed so that, subsequently, signals produced at the output of the gate AND21 are transmitted through the gate AND23.

Subsequent to the restoring of data in the dividend register 30, signals are simultaneously applied to a gate AND26 from (1) the "R" output of the flip-flop FF22, (2) the "R" output of the flip-flop FF21 (indicative of the restoring operation), and (3) the output of the decade counter DC1. In response thereto, an output pulse is produced at the output of the gate AND26 which is transmitted through terminal "i" (FIGS. 4b and 8) to the right shift inputs RS of the divisor register 31. As a result, the data stored in the divisor register 31 is digitally shifted one digit to the right so that the divisor data is aligned with the dividend data and the system is conditioned for the dividing operation. The signal from the gate AND26 is also transmitted to the right-left counter RLC–1 which records a count of 1 therein representing the number of times the divisor data has been digitally shifted to the right. Further, the signal produced at the output of the gate AND26 is transmitted through gate OR22 to the "S" input of the monostable subtract flip-flop FF25 so that a desired output pulse is produced at the "R" output thereof, which is transmitted to the "S" input of the flip-flop FF21, causing it to be set. In response thereto, a desired signal is transmitted from the "S" output of the flip-flop FF21 through terminal "d" (FIGS. 4b and 8) to the subtract control input of the adder-subtractor unit 36 so that the adder-subtractor unit is conditioned for a subtracting operation. Finally, the signal produced at the output of the gate AND26 is transmitted through gates OR22 and OR21 to the "S" input of the monostable restart flip-flop FF24 so that a desired output pulse is produced at the "R" output thereof which is transmitted to the "S" input of the flip-flop FF20 causing another reading out and subtracting operation to be initiated. Such a reading out and subtracting operation is repeatedly performed until a negative answer is produced by the adder-subtractor unit. During each of these subtracting operations, a pulse is transmitted from the gate AND23 through terminal "j" to the "Q" input unit (FIG. 4a). As previously mentioned, the "Q"

input unit counts the number of such pulses and, subsequent to the completion of the subtracting operations at any given divisor position, causes binary coded output data representative of the count to be transmitted to the information register 27 wherein it is stored, such count being representative of a digit of the quotient.

When a negative answer is produced during one of the repeated subtracting operations, a signal is produced at the output of the gate AND22 which is transmitted through the gate OR20 to the "S" input of the monostable restore flip-flop FF23 causing a desired output pulse to be produced at the "R" output thereof which causes the flip-flop FF21 to be reset. In response thereto, a desired control signal is transmitted to the restore control input of the adder-subtractor unit 36 (FIG. 4b) causing the adder-subtractor unit to be conditioned for an adding operation. Additionally, the signal produced at the output of the gate AND21 is transmitted through gates OR20 and OR21 to the "S" input of the monostable restart flip-flop FF24 causing it to be set so that a desired pulse is produced at the "R" output thereof which is transmitted to the "S" input of the flip-flop FF20. Consequently, another reading out and adding operation is initiated so that the data in the dividend register 30 is restored to the value thereof prior to the last subtracting operation. Upon completion of the adding operation, a pulse is produced at the output of the gate AND26 which is transmitted through terminal "i" to the right shift inputs RS of the shift registers in the divisor register 31 (FIGS. 4a and 4b) causing the data therein to be digitally shifted one digit to the right so that the system is conditioned for subsequent subtracting operations. At this time, a count of 2 will be attained in the right-left counter RLC–1 to represent the number of times the divisor data has been digitally shifted to the right. The signal produced at the output of the gate AND26 also initiates another subtracting operation which is again repeatedly performed until a subsequent negative answer is produced by the adder-subtractor unit. When such a negative answer is again produced, the data in the dividend register 30 is again restored to its value prior to the last subtracting operation and the data in the divisor register 31 is again shifted digitally one digit to the right to condition the system for further subtracting operations.

The foregoing operation will be continuously performed by the compute control unit until (1) the count in the right-left counter RLC–1 representative of the number of times the divisor data has been digitally shifted to the right equals the number of times it was previously digitally shifted to the left and (2) a negative answer is produced by the adder-subtractor unit 36. At this latter time, a signal is transmitted from the right-left counter RLC–1 to a gate AND27 simultaneously with the transmission thereto of a signal from the gate AND22. Consequently, a signal is produced at the output of the gate AND27 which is transmitted to the "S" input of the flip-flop FF20 to prohibit the further setting of the flip-flop FF20, thus preventing further operation of the compute control unit. The signal produced at the output of the gate AND27 is also transmitted through terminal "u" (FIGS. 8 and 9) to the print control unit 28 (FIG. 9) as a print control signal so that a printing operation is initiated whereby the data now stored in the information register 27 which is representative of the quotient is sequentially read out and printed-out.

The foregoing operation of the compute control unit will be repeated each time data is controllably stored in the dividend register 30 and the divisor register 31 during the operation of the logic gating circuit LGC–11 in the compute logic circuit shown in FIG. 7. Consequently, numerical data representative of desired ratios between the detected and measured characteristic of a given sample are sequentially printed-out in seriatim order on the recordation sheet shown in FIG. 2 subsequent to the sequential printing-out in seriatim order of numerical data representative of the measured and detected characteristics.

*Print control unit*

Referring to FIG. 9, a print control unit 28 is shown in more detailed block form. As previously mentioned, the print control unit is provided for the purpose of controlling the sequential reading out and printing-out of data stored in the information register 27.

When a "print control" signal is received from the listing logic circuit 25 (FIG. 6) through terminal "o" or the compute control unit 35 (FIG. 8) through terminal "u," it is transmitted to the "S" input of a control flip-flop FF30 causing the flip-flop to be set so that desired output signals are produced at the "S" and "R" outputs thereof. The "S" output signal is transmitted directly to an input of a gate AND30 to condition the gate for the production of desired output pulse. The "R" output signal is transmitted to the "S" input of a monostable flip-flop FF31 causing a desired output pulse to be produced at the "S" output thereof which is transmitted through a gate OR30 to the "S" input of a second monostable flip-flop FF32. In response thereto, a desired output pulse is produced at the "S" output of the second monostable flip-flop FF32 which is transmitted to an input of the gate AND30. During the time period when the listing logic circuit 25 (FIG. 6) or the compute logic circuit 33 (FIG. 7) is operative, a third input signal is transmitted to an input of the gate AND30 through terminal "m" from the "S" output of the flip-flop FF3 (FIG. 6) in the listing logic circuit or the "S" output of the flip-flop FF13 (FIG. 7) in the compute logic circuit. If output signals are simultaneously applied to the gate AND30 from the "S" output of the flip-flop FF30 and from either the "S" output of the flip-flop FF3 in the listing logic circuit or the flip-flop FF13 in the compute logic circuit, the gate AND30 is opened so that a pulse subsequently produced at the "S" output of the flip-flop FF32 will pass therethrough. In view of the foregoing, it will be readily appreciated that a pulse is produced at the "S" output of the flip-flop FF32 a prescribed time period after the flip-flop FF30 has been driven to the set condition by the application thereto of a print control signal and, thus, the pulse is transmitted through the gate AND30.

The print control signal applied to the "S" input of the flip-flop FF30 is also transmitted to the "S" input of a control flip-flop FF33 through a gate OR31 so that the flip-flop FF33 is driven to the set condition. Consequently, an output signal is produced at the "S" output of the flip-flop FF33 which is indicative of the desire to print-out data stored in the information register 27 and which is transmitted to a gate AND31 causing the gate to be opened so that pulses passing through the gate AND30 also pass through the gate AND31. Pulses transmitted through the gate AND31 are transmitted through terminal "b" to the solenoids S0–S9 (FIG. 4a) which are associated with the number keys of the typewriter 22. As a result, the solenoids S0–S9 are temporarily conditioned for selective energization by straight decimal data outputs from the decoder 40 resulting from transmission thereto of data from the information register 27, thereby insuring that the desired numerical data is controllably printed-out.

The pulse transmitted through the gate AND30 is also applied to the "S" input of a monostable flip-flop FF34 so that desired output pulses are produced at the "S" and "R" outputs thereof. The "R" output pulse is applied to a gate AND32 which is conditioned to pass the pulse by the "S" output of the flip-flop FF33 so that the pulse is transmitted therethrough and through terminal "a" (FIG. 4b) to the left shift inputs LS of the shift registers of the information register 27 (FIGS. 4a and 4b). In response thereto, the data stored in the shift registers of the information register 27 is digitally shifted one digit to the left so that data representative of the most significant digit of the data stored therein is transmitted to the decoder 40. Consequently, a corresponding one of the solenoids S0–S9 is energized, causing the associated typewriter key to be operated so that the number represented by the data transmitted to the decoder 40 is printed-out by the typewriter 22. The "R" output pulse of the flip-flop FF34 is also transmitted to the "S" input of the flip-flop FF3 through the gate OR31 to insure that the flip-flop FF33 is maintained in the set condition. The "S" output pulse produced by the flip-flop FF34 is transmitted through the gate OR30 to the "S" input of the monostable flip-flop FF32 so that another desired output pulse is produced thereby which is transmitted through gates AND30 and AND31 and terminal "b" to the common end of the solenoids S0–S9 to temporarily condition the solenoids for another printing operation. Output pulses are again produced at the "S" and "R" outputs of the flip-flop FF34 so that the data stored in the shift registers of the information register 27 in FIGS. 4a and 4b is again digitally shifted one digit to the left whereby the data representative of the second most significant digit is transmitted to the decoder 40 and the number represented thereby is printed-out. This cycle will continuously repeat itself until all the data in the information register 27 is sequentially read out and a composite number representative of the data is printed-out.

For the purpose of counting the number of left shift operations performed on the shift registers of the information register 27 and, therefore, to detect the completion of the reading out of the information stored in the information register, a ten stage shift register counter SRC20 has been provided. As may be seen, the tenth stage output of the counter SRC20 is connected to the "R" input of the flip-flop FF30 so that, after the data in the information register 27 has been read out and printed-out, the flip-flop is reset to condition the print control unit for a subsequent print-out controlling operation. The tenth stage output of the counter SRC20 is also connected through terminal "q" (FIGS. 6, 7 and 9) to the listing logic circuit and the compute logic circuit so that the operations thereof are initiated by a tenth stage output signal and desired data is thereafter transmitted to and stored in the information register 27 for the purpose of being subsequently printed-out.

The "R" output of the flip-flop FF30 produced when the flip-flop is reset is transmitted to a gate AND33 to condition the gate for the passage of the next "S" output pulse produced by the flip-flop FF34. The pulse from the flip-flop FF34 passes through gate AND33 and through a gate OR32 to the "S" input of a monostable flip-flop FF35 causing a desired output pulse to be produced at the "S" output thereof. This latter pulse is transmitted through terminal "c" (FIGS. 9 and 4b) to the tab control solenoid ST (FIG. 4a) causing it to be energized so that the tab key of the typewriter 22 is operated, whereby the printing head of the typewriter is positioned at the next column to condition the typewriter for printing-out data representative of the next desired characteristic.

When a tab control pulse is applied to the print control unit from the listing logic circuit 25 (FIG. 6) through terminal "p," it is likewise applied through the gate OR32 to the "S" input of the monostable flip-flop FF35. Consequently, a desired output pulse is produced at the "S" output of the flip-flop FF35 which is transmitted to the tab control solenoid ST causing it to be energized and the associated tab key to be operated.

The shift register counter SRC–20 also controls the printing-out of decimal points in selected data printed-out on the recordation sheet. In the exemplary arrangement, the counter SRC–20 is set up to cause a decimal point to be printed-out subsequent to the printing-out of the seventh digit of data when data representative of the ratios of the scaler counts is produced and when data representative of the count time is produced in terms of minutes. As may be seen, the seventh stage output of the counter SRC–20 is transmitted to inputs of gates AND33 and AND34. Additionally, signals are transmitted to the gate AND34 from the "R" output of a flip-flop FF36 when in the reset condition and from the "S" output of the flip-flop FF37 when in the set condition. For the purpose of causing the flip-flop FF36 to be driven to the reset condition, a control switch 45 (see FIG. 3) has been provided. When the control switch is thrown into engagement with the lowermost contact terminal thereof, the flip-flop FF36 is driven to the reset condition which is indicative of the desire to print-out data representative of the count time in terms of minutes. If the listing logic circuit 25 (FIG. 6) is controlling the printing-out of data representative of the time of count, a signal is transmitted from the third stage output of the logic gating circuit LGC–1 (FIG. 6) through terminal "v" to the "S" input of a flip-flop FF37 causing the flip-flop to be set. Consequently, when (1) the listing logic circuit is controlling the printing-out of data representative of the time of count, (2) the flip-flop FF36 is in the reset condition, and (3) a seventh stage output signal is produced by the shift register counter SRC–20, a desired output signal is produced at the output of the gate AND34 which is transmitted through a gate OR33 to the "R" input of the flip-flop FF33. In response thereto, the flip-flop FF33 is reset causing a desired output signal to be produced at the "R" output thereof which is transmitted to the input of a gate AND35 to condition the gate for the passage of the next pulse transmitted through the gate AND30. Thus, the next pulse produced by the gate AND30 is transmitted through the gate AND35 and through terminal "k" to the period control solenoid SP (FIGS. 4a and 4b) causing the solenoid to be energized and the associated period key to be operated, whereby a desired decimal point is printed-out.

In like manner, when (1) the listing logic circuit is controlling the printing-out of data representative of the time of count, (2) the flip-flop FF36 is in the set condition indicative of the desire to print-out data representative of the time of count in terms of seconds, and (3) an eighth stage output signal is produced by the shift register counter SRC–20, a desired output signal is produced at the output of a gate AND37 which causes a decimal point to be printed-out subsequent to the printing-out of the eighth digit.

When the compute logic circuit 33 is controlling the printing-out of data representative of ratios between counts in the scalers, a signal is transmitted from the compute logic circuit through terminal "w" to the input of the gate AND33. When the seventh stage output signal is subsequently produced by the counter SRC–20, it is transmitted through the gate AND33 and the gate OR33 to the "R" input of the flip-flop FF33. As a result, the next signal transmitted through the gate AND30 is transmitted through the gate AND35 to the period control solenoid SP (FIGS. 4a and 4b) so that a decimal point is printed-out. When the compute logic circuit 33 (FIG. 7) is controlling the printing-out of data representative of the count in a scaler divided by the time of count, a signal is transmitted from the compute logic circuit through terminal "x" to the input of a gate AND36. Subsequently, when the ninth stage output signal is produced by the counter SRC–20, it is transmitted through the gate AND36 and the gate OR33 to the flip-flop FF33, so that, in like manner, a decimal point is printed-out.

*Mechanical coupling between solenoid and typewriter key*

Referring to FIG. 10, a typical coupling arrangement is shown for coupling the solenoids S0–S9, SCS, SP and ST (FIG. 4a) to associated keys of the typewriter 22. As may be seen, the control rod 50 for the solenoid is connected to a pivotable control plate 51 to control the position thereof in respect of a fixed pivot point 51a on the frame of the typewriter. The pivotable plate 51, in turn, controls the movement of a control link 52 which is secured thereto and which is secured to a desired typewriter key. The control rod 50 is normally biased away from the solenoid by a spring member 53 interposed between a support plate 54 secured to the typewriter and a pin 55 secured to the control rod. As a result, the pivotable plate 51 is positioned such that when the solenoid is deenergized, the control link 52 has no controlling effect on the typewriter key and the typewriter key is in its normal position. When the solenoid is energized, the control rod 50 is drawn to the right against the biasing force of the spring 53, thus causing the pivotable plate 51 to pivot in the counterclockwise direction, as view in FIG. 10, around the pivot point 51a. As a result, the control link 52 is drawn downward to exert downward force on the typewriter key so that the key is likewise drawn downward. This simulates the operation of depressing the typewriter key manually and thus causes the typewriter to function as if the key had been depressed so that a desired number or character is printed. When the solenoid is thereafter deenergized, the spring 53 causes the apparatus to return to its steady state nonoperative condition. Thus, it will be seen that rather simple apparatus has been provided which may be readily applied to an existing typewriter for causing keys of the typewriter to be operated in response to the energization of associated solenoids.

I claim as my invention:

1. In a system for processing data which is representative of desired composite numbers, the combination which comprises, a dividend register wherein data representative of a desired dividend may be stored, a divisor register wherein data representative of a desired divisor may be stored, indicator means responsive to the transmission thereto of data for producing a visual indication of the numerical value thereof, means for selectively and sequentially transmitting the data representative of the composite numbers to the indicator means, means rendered operable upon completion of the transmission of the selected data to the indicator means for causing selected data to be transmitted to and stored in the dividend register and for causing different selected data to be transmitted to and stored in the divisor register, aligning means rendered operative when data is stored in the dividend and divisor registers for digitally shifting the data in the divisor register from its initial stored position to the last position whereat the value of the dividend data is greater than the value of the divisor data whereby the divisor data is aligned with the dividend data, dividing means rendered operative in response to the alignment of the divisor data with the dividend data for repeatedly subtracting the divisor data from the dividend data at each succeeding position between the aligned position and the initial position of the divisor data until a negative answer is produced and restoring the dividend data to the value thereof prior to the last subtracting operation during which the negative answer was produced before subtracting operations are initiated at the next succeeding divisor data position, and means for counting the number of subtracting operations at each succeeding divisor data position prior to the production of a negative answer and for transmitting data representative of the cumulative count at each divisor data position to the indicator means, the count at each succeeding divisor data position being representative of a succeeding digit of the quotient.

2. In a system for processing data which is representative of desired composite numbers, the combination which comprises, a dividend register wherein data representative of a desired dividend may be stored, a divisor register wherein data representative of a desired divisor may be stored, indicator means responsive to the transmission thereto of data for producing a visual indication of the numerical value thereof, means for selectively and sequentially transmitting the data representative of the composite numbers to the indicator means, means rendered operable upon completion of the transmission of the selected data to the indicator means for causing selected data to be transmitted to and stored in the dividend register and for causing different selected data to be transmitted to and stored in the divisor register, aligning means rendered operative when data is stored in the dividend and divisor registers for positioning the data in the divisor register relative to the data in the dividend register to the last position whereat the value of the dividend data is greater than the value of the divisor data whereby the divisor data is aligned with the dividend data, dividing means rendered operative in response to the alignment of the divisor data with the dividend data for repeatedly subtracting the divisor data from the dividend data at each succeeding position between the aligned position and the initial position of the divisor data until a negative answer is produced and restoring the dividend data to the value thereof prior to the last subtracting operation during which the negative answer was produced before subtracting operations are initiated at the next succeeding divisor data position, and means for counting the number of subtracting operations at each succeeding divisor data position prior to the production of a negative answer and for transmitting data representative of the cumulative count at each divisor data position to the indicator means, the count at each succeeding divisor data position being representative of a succeeding digit of the quotient.

3. In a system for processing data which is representative of desired composite numbers, the combination which comprises, a dividend register wherein data representative of a desired dividend may be stored, a divisor register wherein data representative of a desired divisor may be stored, recordation means responsive to the transmission thereto of data for providing a record of the numerical value thereof, means for selectively and sequentially transmitting data representative of the composite numbers to the recordation means, means responsive to the completion of transmission of selected data to the recordation means for causing data representative of desired composite numbers to be sequentially transmitted to and stored in the dividend register at desired times and data representative of different desired composite numbers to be sequentially transmitted to and stored in the divisor register at desired times so that desired dividing operations may be performed therebetween, aligning means rendered operative in response to the storage of data in the dividend and divisor registers for digitally shifting the data in the divisor register to the left to the last position at which the dividend data is greater in value than the divisor data whereat the divisor data is aligned with the dividend data, dividing means rendered operative in response to alignment of the divisor data with the dividend data for (1) repeatedly subtracting the divisor data from the dividend data until a negative answer is produced, (2) restoring the dividend data to its value prior to the last subtracting operation and shifting the divisor data one digit to the right when a negative answer is produced, and (3) repeatedly performing the subtracting, restoring and shifting operations until the divisor data is returned to its initial position and a negative answer is produced, means for counting the number of subtracting operations performed at each divisor data position and for storing data representative thereof, the cumulative count at each succeeding divisor data position being representative of a succeeding digit of the quotient, and means rendered operative when the divisor data is returned to its initial position and a negative answer is produced for transmitting the data representative of the quotient to the recordation means.

4. In a system for processing data which is representative of desired composite numbers, the combination which comprises, a dividend register wherein data representative of a desired dividend number may be stored, a divisor register wherein data representative of a desired divisor number may be stored, recordation means responsive to the transmission thereto of data for providing a record of the numerical value thereof, means for selectively and sequentially transmitting data representative of the composite numbers to the recordation means, means responsive to the completion of transmission of selected data to the recordation means for causing selected data representative of desired composite numbers to be sequentially transmitted to and stored in the dividend register at desired times and for causing selected data representative of different desired composite numbers to be sequentially transmitted to and stored in the divisor register at desired times so that desired dividing operations may be performed therebetween, aligning means rendered operative in response to the storage of data in the dividend and divisor registers for (1) subtracting the divisor data from the dividend data, (2) restoring the dividend data to its original value, (3) shifting the divisor data one digit to the left when a positive answer is produced, (4) repeating the subtracting, restoring and shifting operations until a negative answer is produced, and (5) shifting the divisor data one digit to the right when a negative answer is produced so that the divisor data is aligned with the dividend data, dividing means rendered operative in response to the completion of the operation of the aligning means for (1) repeatedly subtracting the divisor data from the dividend data until a negative answer is produced, (2) restoring the dividend data to its value prior to the last subtracting operation and shifting the divisor data one digit to the right when a negative answer is produced, and (3) repeating the subtracting, restoring and shifting operations until the divisor data has been returned to its initial position and a negative answer is produced, means for counting the number of subtracting operations performed at each divisor data position during operation of the dividing means and for storing data representative of the cumulative count at each position, the cumulative count at each succeeding position being representative of a succeeding digit of the quotient, and means responsive to the completion of operation of the dividing means for transmitting the count representing data to the recordation means.

5. In a data processing system utilizable in connection with radioactive sample detecting and measuring apparatus including a spectrometer for producing numerical data representative of desired radioactivity characteristics of the samples, the combination which comprises, a dividend register wherein data representative of a desired characteristic may be stored, a divisor register wherein data representative of a desired characteristic may be stored, an information register wherein desired data may be stored, a gating circuit operable to control the transmission of data from the spectrometer to the registers, a typewriter for typing out desired data on desired record sheet, means for selectively rendering the typewriter operative to type out data store in the information register so that selected data for a given sample is typed out in seriatim across the record sheet and corresponding data for different samples is disposed in vertical columnar form on the record sheet, a listing logic circuit operable for controlling the operation of the gating circuit so that data representative of desired characteristics for a sample is sequentially transmitted from the spectrometer to the information register and selected data is typed out on the record sheet, a compute logic circuit rendered operative in response to completion of operation of the listing logic circuit for controlling the operation of the gating circuit so that desired data is selectively transmitted from the spectrometer to the dividend and divisor registers wherein it is stored and desired divisional operations may be sequentially performed, computational means including a compute control circuit and an adder-subtracter circuit for aligning the divisor data with the dividend data by digitally shifting the data in the divisor register to the left from its initial position to the last position whereat the value of the dividend data is greater than the value of the divisor data and for subsequently performing a dividing operation by (1) repeatedly subtracting the divisor data from the dividend data until a negative answer is produced, (2) restoring the dividend data to its value prior to the last subtracting operation and digitally shifting the divisor data one digit to the right when a negative answer is produced, and (3) repeating the subtracting, restoring and shifting operations until the divisor data is returned to its initial position and a negative answer is produced, and means for counting the number of subtracting operations performed at each divisor data position and for causing data representative of the cumulative count at each position to be stored in the information register so that data representative of desired characteristic ratios is selectively typed out, the cumulative count at each succeeding divisor data position representing a succeeding digit of the quotient.

6. In a system for processing binary coded decimal data which is representative of desired composite numbers, the combination which comprises, a dividend register wherein binary coded decimal data representative of a desired dividend number may be stored, a divisor register wherein binary coded decimal data representative of a desired divisor number may be stored, a decoder for producing straight decimal data in response to the transmission thereto of binary coded decimal data, a typewriter, means for controlling the operation of the typewriter in accordance with the production of straight decimal data by the decoder so that the data is printed out, means for selectively and sequentially transmitting binary coded decimal data representative of desired composite numbers to the decoder, means rendered operable in response to the completion of the transmission of binary coded decimal data representative of desired composite numbers to the decoder for selectively causing binary coded decimal data to be stored in the dividend and divisor registers so that desired divisional operations may be sequentially performed between data representative of desired composite numbers, aligning means rendered operative in response to the storage of binary coded decimal data in the registers for digitally shifting the data stored in the divisor register to the left from its initial position to the last position whereat the value of the dividend data is greater than the value of the divisor data, dividing means rendered operative in response to the completion of the operation of the aligning means for (1) repeatedly subtracting the divisor data from the dividend data until a negative answer is produced, (2) restoring the dividend data to its value prior to the last subtracting operation and digitally shifting the divisor data one digit to the right when a negative answer is produced, and (3) repeating the subtracting, restoring and shifting operations until the divisor data is returned to its initial position and a negative answer is produced, means for counting the number of subtracting operations performed at each divisor data position during operation of the dividing means and for storing data representative of the cumulative count at each position in binary coded decimal data form, the cumulative count at each succeeding divisor data position representing a succeeding digit of the quotient, and means operative in response to the completion of the operation of the dividing means for transmitting the quotient representing binary coded decimal data to the decoder.

7. In a system for performing a dividing operation, the combination which comprises, a dividend register, a divisor register, means for storing data representative of desired numbers in the registers, aligning means rendered operative in response to the storage of data in the registers for digitally shifting the divisor data to the left to the last position at which the dividend has a greater value than the divisor, and dividing means rendered operative in response to the completion of operation of the aligning means for (1) repeatedly subtracting the divisor from the dividend until a negative answer is produced, (2) restoring the dividend to its value prior to the last subtracting operation and digitally shifting the divisor one digit to the right when a negative answer is produced, and (3) repeating the subtracting, restoring and shifting operations until the divisor is restored to its initial position and a negative answer is produced, the number of subtracting operations at each succeeding divisor position prior to the production of a negative answer being representative of a succeeding digit of the quotient.

8. In a system for performing a dividing operation, the combination which comprises, a dividend register, a divisor register, means for storing data representative of desired numbers in the registers, aligning means rendered operative in response to the storage of data in the registers for digitally shifting the divisor data in a first direction to the last position at which the dividend has a greater value than the divisor, and dividing means rendered operative in response to the completion of operation of the aligning means for (1) repeatedly subtracting the divisor from the dividend until a negative answer is produced, (2) restoring the dividend to its value prior to the last subtracting operation and digitally shifting the divisor one digit in a second direction when a negative answer is produced, and (3) repeating the subtracting, restoring and shifting operations until the divisor is restored to its initial position and a negative answer is produced, the number of subtracting operations at each succeeding divisor position prior to the production of a negative answer being representative of a succeeding digit of the quotient.

9. In a system for performing a dividing operation, the combination which comprises, a dividend register, a divisor register, means for storing data representative of desired numbers in the registers, aligning means rendered operative in response to the storage of data in the registers for positioning the divisor data relative to the dividend data to the last position at which the dividend has a greater value than the divisor, and dividing means rendered operative in response to the completion of operation of the aligning means for (1) repeatedly subtracting the divisor from the dividend until a negative answer is produced, (2) restoring the dividend to its value prior to the last subtracting operation and digitally shifting the divisor one digit to the right when a negative answer is produced, and (3) repeating the subtracting, restoring and shifting operations until the divisor is restored to its initial position and a negative answer is produced, the number of subtracting operations at each succeeding divisor position prior to the production of a negative answer being representative of a succeeding digit of the quotient.

10. In a system for performing a dividing operation, the combination which comprises, a divided register wherein a desired number may be stored, a divisor register wherein a desired number may be stored, aligning means operable to digitally shift the number in the divisor to the left to the last position at which the dividend has a greater value than the divisor, dividing means operable to (1) repeatedly subtract the divisor from the dividend until a negative answer is produced, (2) restore the dividend to its value prior to the last subtracting operation and shift the divisor one digit to the right when a negative answer is produced, and (3) repeat the subtracting, restoring, and shifting operations until the divisor has been returned to its initial position and a negative answer is produced, the number of subtracting operations at each succeeding divisor position prior to the production of a negative answer being representative of a succeeding digit of the quotient.

11. In a system for performing a dividing operation, the combination which comprises, a dividend register, a divisor register, means for storing desired numbers in the registers, aligning means rendered operative in response to the storage of numbers in the registers for digitallly shifting the divisor to the left to the last position at which the dividend has a greater value than the divisor, dividing means rendered operative in response to the comple-tion of the operation of the aligning means for (1) repeatedly subtracting the divisor from the dividend until a negative answer is produced, (2) restoring the dividend to its value prior to the last subtracting operation and digitally shifting the divisor one digit to the right when a negative answer is produced, and (3) repeating the subtracting, restoring and shifting operations until the divisor is restored to its initial position and a negative answer is produced, and means for counting the number of subtracting operations performed at each succeeding divisor position and for storing data representative of the cumulative count at each position, the cumulative count at each succeeding position being representative of a succeeding digit of the quotient.

12. In a system for performing a dividing operation, the combination which comprises, a dividend register, a divisor register, means for storing desired numbers in the dividend and divisor registers, aligning means rendered operative in response to the storage of data in the registers for (1) subtracting the divisor from the dividend, (2) restoring the dividend to its original value and shifting the divisor one digit to the left when a positive answer is produced, (3) repeating the subtracting, restoring and shifting operations until a negative answer is produced, and (4) shifting the divisor one digit to the right when a negative answer is produced so that the divisor is aligned with the dividend, dividing means rendered operative in response to the completion of operation of the aligning means for (1) repeatedly subtracting the divisor from the dividend until a negative answer is produced, (2) restoring the dividend to its value prior to the last subtracting operation and digitally shifting the divisor one digit to the right when a negative answer is produced, and (3) repeating the subtracting, restoring and shifting operations until the divisor is restored to its initial position and a negative answer is produced, and means for counting the number of subtracting operations performed at each divisor position and for causing data representative of the cumulative count at each position to be stored, the cumulative count at each succeeding position being representative of a succeeding digit of the quotient.

13. In a system for performing a dividing operation between binary coded decimal data representative of desired numerical values, the combination which comprises, a dividend register, a divisor register, means for storing binary coded decimal data representative of desired numbers in the registers, aligning means for digitally shifting the data in the divisor register to the left to the last position whereat the value of the dividend data is greater than the value of the divisor data, dividing means rendered operative in response to the completion of the operation of the aligning means for (1) repeatedly subtracting the divisor data from the dividend data until a negative answer is produced, (2) restoring the dividend data to its value prior to the last subtracting operation and digitally shifting the divisor data one digit to the right when a negative answer is produced, and (3) repeating the subtracting, restoring and shifting operations until the divisor data is restored to its initial position and a negative answer is produced, and means for counting the number of subtracting operations at each succeeding divisor data position and for recording the cumulative number of subtracting operations at each position, the cumulative number of counting operations at each succeeding divisor data position being representative of succeeding digits of the quotient.

References Cited

UNITED STATES PATENTS

| | | | |
|---|---|---|---|
| 2,905,821 | 9/1959 | Younkin | 235—151 |
| 2,932,450 | 4/1960 | Knight et al. | 235—159 |
| 2,947,475 | 8/1960 | Rauch et al. | 235—61.6 |
| 2,961,159 | 11/1960 | Gallager et al. | 235—159 |

(Other references on following page)

UNITED STATES PATENTS 3,009,062  11/1961  Brooksbank et al. __ 235—151.3
3,120,606  2/1964  Eckert et al. _____ 235—160

OTHER REFERENCES

IBM Electronic Data-Processing Machines, Type 705, Preliminary Manual of Operation, copyright 1955 (pp. 104 and 105 relied on). Received in U.S. Patent Office on Jan. 10, 1958. (Copy available in Group 240.)

MALCOLM A. MORRISON, *Primary Examiner.*

ROBERT C. BAILEY, MARTIN P. HARTMAN,
*Examiners.*